(12) United States Patent
Nagata

(10) Patent No.: US 9,424,222 B1
(45) Date of Patent: Aug. 23, 2016

(54) APPARATUSES AND METHODS FOR CHARGE SHARING ACROSS DATA BUSES BASED ON RESPECTIVE LEVELS OF A DATA BUSES

(71) Applicant: Micron Technology, Inc., Boise, ID (US)

(72) Inventor: Kyoichi Nagata, Kawasaki (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/847,858

(22) Filed: Sep. 8, 2015

(51) Int. Cl.
*H03K 19/094* (2006.01)
*G06F 13/40* (2006.01)

(52) U.S. Cl.
CPC .................. *G06F 13/4077* (2013.01)

(58) Field of Classification Search
CPC ......... G11C 7/12; G11C 8/08; G06F 13/4077
USPC ..................... 365/203–204; 326/86
See application file for complete search history.

(56) References Cited

U.S. PATENT DOCUMENTS

| 5,565,796 | A | 10/1996 | Nakase | |
|---|---|---|---|---|
| 7,830,727 | B2 * | 11/2010 | Arsovski | G11C 7/12 365/156 |
| 8,897,054 | B2 * | 11/2014 | Choserot | G11C 7/12 365/189.05 |
| 2010/0165753 | A1 * | 7/2010 | Wijeratne | G11C 7/18 365/189.11 |
| 2013/0163358 | A1 * | 6/2013 | Bringivijayaraghavan | G11C 7/1048 365/203 |

* cited by examiner

*Primary Examiner* — Jason M Crawford
(74) *Attorney, Agent, or Firm* — Dorsey & Whitney LLP

(57) ABSTRACT

Apparatuses and methods for charge sharing across data buses based on respective levels of the data buses are disclosed herein. An example apparatus may include a first bus, a second bus, and a charge sharing circuit coupled to each of the first bus and the second bus. The charge sharing circuit may be configured to couple the first bus to the second bus based on logic levels of the first bus and the second bus. For example, the charge sharing circuit may couple the first bus to the second bus responsive to the first bus and the second bus having inverted logic levels.

16 Claims, 15 Drawing Sheets

APPARATUSES AND METHODS FOR CHARGE SHARING ACROSS DATA BUSES BASED ON RESPECTIVE LEVELS OF A DATA BUSES

BACKGROUND

As electronic devices continue to evolve, there is a constant tension between size, speed, and power consumption. With increasing data access speed, current consumption has become a challenge in some memory designs. Especially, an amount of a current consumption on data buses such as read/write data buses (RWBS) can occupy more than 10% of total current consumption in some dynamic random access memory (DRAM) designs. For example, in some double data rate (DDR) 3 or DDR4 implementations, 128 bits of data (e.g., a burst length of 8*16 I/O data buses) are required to be transferred simultaneously. A method to lower the voltage level applied to RWBS is considered to solve this problem, however, it becomes difficult to realize both a high data access speed and lowering the voltage level applied to RWBS.

DETAILED DESCRIPTION

Apparatuses and methods for charge sharing across data buses based on respective levels of a data busses are disclosed herein. Certain details are set forth below to provide a sufficient understanding of embodiments of the disclosure. However, it will be clear to one having skill in the art that embodiments of the disclosure may be practiced without these particular details. Moreover, the particular embodiments of the present disclosure described herein are provided by way of example and should not be used to limit the scope of the disclosure to these particular embodiments. In other instances, well-known circuits, control signals, timing protocols, and software operations have not been shown in detail in order to avoid unnecessarily obscuring the disclosure.

Figure 1:
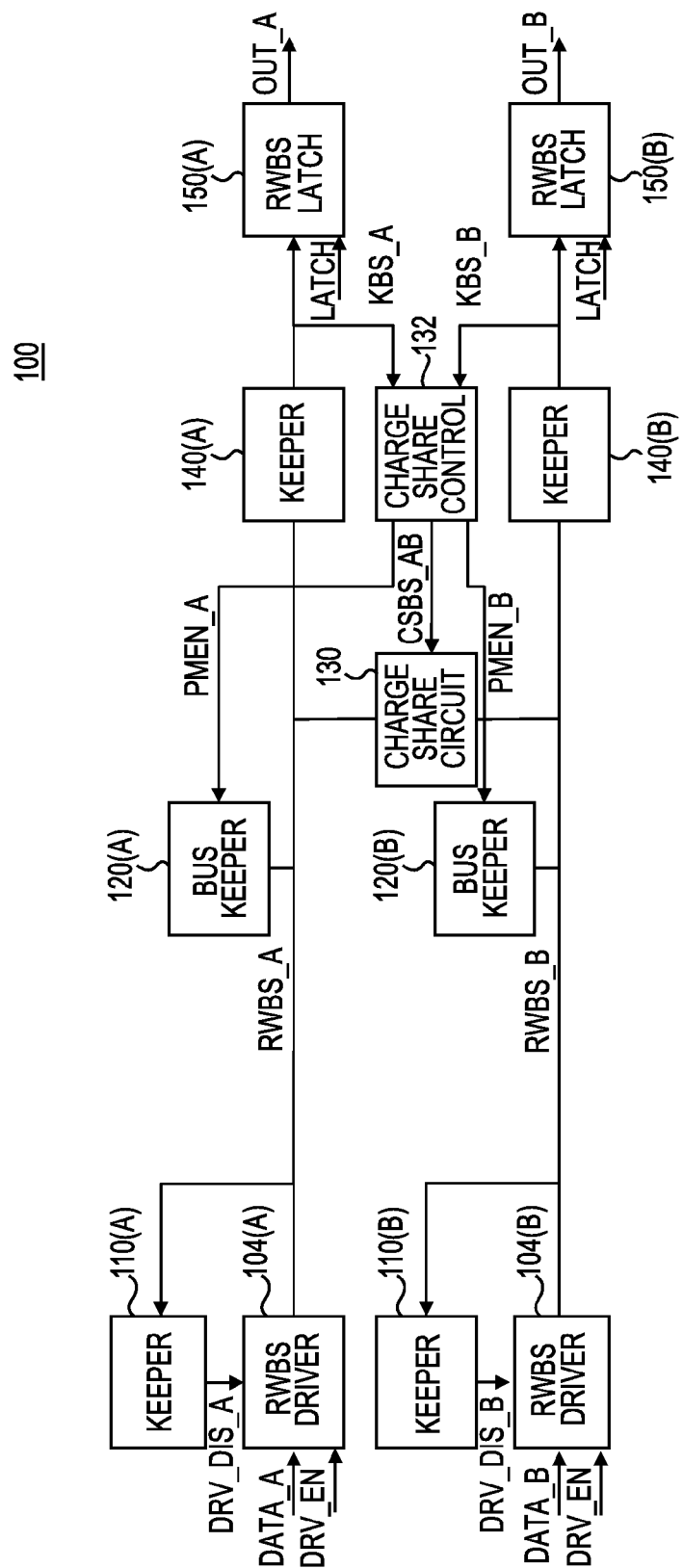
FIG. 1 is a block diagram of an apparatus including a charge share circuit according to an embodiment of the disclosure.

FIG. 1 is a block diagram of an apparatus 100 (e.g., an integrated circuit, a memory device, a memory system, an electronic device or system, a smart phone, a tablet, a computer, a server, etc.) including a charge share circuit 130 configured to share charge between read/write data lines RWBS based on relative levels (e.g., voltages) of the data lines according to an embodiment of the disclosure. The apparatus 100 may include a first RWBS line RWBS_A and a second RWBS line RWBS_B. A first end of the RWBS_A line is coupled to a RWBS driver 104(A) and a keeper 110(A). A second end of the RWBS_A line is coupled to a keeper 140(A) in series with a RWBS latches 150(A). A first end of the RWBS_B line is coupled to a RWBS driver 104(B) and a keeper 110(B). A second end of the RWBS_B line is coupled to a keeper 140(B) in series with a RWBS latches 150(B). The apparatus 100 may further include a charge share control circuit 132 and the charge share circuit 130 coupled between the RWBS_A and RWBS_B lines. The apparatus 100 may further include a bus keeper 120(A) coupled to the RWBS_A line between the first end and the second end and a bus keeper 120(B) coupled to the RWBS_B line between the first end and the second end.

Each of the RWBS driver 104(A-B) may receive a data signal DATA_A/B and a driver enable signal DRV_EN. The RWBS driver 104(A) may receive a driver disable signal DRV_DIS_A from the keeper 110(A) and the RWBS driver 104(B) may receive a driver disable signal DRV_DIS_B from the keeper 110(B). The RWBS driver 104(A) may drive the DATA_A signal to the RWBS_A line based on the DRV_EN signal and the DRV_DIS_A signal, and the RWBS driver 104(B) may drive the DATA_B signal to the RWBS_B line based on the DRV_EN signal and the DRV_DIS_B signal. For example, the RWBS driver 104(A) may drive the DATA_A signal to the RWBS_A line when the DRV_DIS_A signal has a different logic level than the DATA_A signal and the DRV_EN signal is active (e.g., a high logic level). Further, the RWBS driver 104(B) may drive the DATA_B signal to the RWBS_B line when the DRV_DIS_B signal has a different logic level than the DATA_B signal and the DRV_EN signal is active (e.g., a high logic level).

Each of the keepers 110(A-B) may latch the DRV_DIS_A/B signal at a value of the RWBS_A/B line. When charge is shared between the RWBS_A and RWBS_B lines via the charge share circuit 130 (e.g., resulting in the voltages of the RWBS_A and RWBS_B lines transitioning to a mid-range level between the high logic level and the low logic level), each of the keepers 110(A-B) may latch the DRV_DIS_A/B signal at the previous value (e.g., high logic level or low logic level) of the RWBS_A/B line.

Each of the bus keeper 120(A-B) may be configured to hold (e.g., maintain) the respective RWBS_A/B line at a desired value between voltage changes driven by the respective RWBS driver 104(A-B) or during a charge share by the charge share circuit 130. Similar to the keepers 110(A-B), each of the keepers 140(A-B) may latch the KBS_A/B signal at a value of the RWBS_A/B line. When charge is shared between the RWBS_A and RWBS_B lines via the charge share circuit 130 (e.g., resulting in the voltages of the RWBS_A and RWBS_B lines transitioning to a mid-range level between the high logic level and the low logic level), each of the keepers 140(A-B) may latch the KBS_A/B signal at the previous value (e.g., high logic level or low logic level) of the RWBS_A/B line.

Each of the RWBS latches 150(A-B) may latch the OUT_A/B signals at an output based on the KBS_A/B signal received via the inverters 160(A-B) and responsive to a latch signal LATCH. The keepers 140(A-B) may allow one or both of the RWBS_A/B lines to remain at mid-range level while still being able to drive an output signal to a high or low logic level by storing the previous value of the RWBS_A/B signal prior to the charge sharing.

The charge share control circuit 132 may receive the KBS_A and KBS_B signals from the keepers 140(A-B), and may provide a charge share control signal CSBS_AB to the charge share circuit 130 having a value based on the relative logic levels of the KBS_A (e.g., from the RWBS_A line) and KBS_B (E.g., from the RWBS_B line) signals. In an example, the charge share control circuit 132 may assert the CSBS_AB signal responsive to the KBS_A and KBS_B signals transitioning to opposite (e.g., inverted) logic levels. Responsive to the CSBS_AB signal being asserted, the charge share circuit 130 may couple the RWBS_A and RWBS_B lines together.

In operation, when the RWBS_A and RWBS_B lines have inverted logic levels, the charge share circuit 130 may couple the lines together to charge share across the lines responsive the CSBS_AB signal. The charge share control circuit 132 may detect whether inverted logic levels between the RWBS_A and RWBS_B lines exist based on the KBS_A and KBS_B signals received from the respective keepers 140(A-B) and may activate the CSBS_AB signal when the inverted logic levels are detected as a result of a transition of the RWBS_A and RWBS_B signals. When a charge share occurs, the voltages of the RWBS_A and RWBS_B lines equalize at a mid-range level between a low logic level and a high logic level.

On the output end of the apparatus 100, each of the keepers 140(A-B) may receive at latch an inverted logic level of the respective RWBS_A/B line as the KBS_A/B signal. Each of the RWBS latches 150(A-B) may receive a respective KBS_A/B signal inverted via the respective inverters 160(A-B), and may provide the latched value at an output as the respective OUT_A/B signal. When the level of the RWBS_A/B lines are at the mid-range level due to charge sharing, the latched value of the KBS_A/B signals by each of the keepers 140(A-B) remain unchanged from the most previous high or low logic level of the respective RWBS_A/B line.

On the input end of the apparatus 100, each of the RWBS driver 104(A-B) may drive the respective DATA_A/B signal on the respective RWBS_A/B line based on values of the DRV_EN signal and the respective DRV_DIS_A/B signal. The DATA_A/B signals may include data retrieved from a memory cell or may include data to be provided to a memory cell. Each of the keepers 110(A-B) may receive and latch a logic level of the respective RWBS_A/B line. Responsive to the DRV_EN signal being active, each of the RWBS drivers 104(A-B) may drive the respective DATA_A/B signals to the respective RWBS_A/B line when the logic level of respective DRV_DIS_A/B differs from the logic level of the respective DATA_A/B signal. Otherwise, the RWBS driver 104(A-B) will not drive the DATA_A/B signal to the respective RWBS_A/B line. When the level of the RWBS_A/B lines are at the mid-range level due to charge sharing, the latched value of the DRV_DIS_A/B signals by each of the keepers 110(A-B) remain unchanged from the most previous high or low logic level of the respective RWBS_A/B line.

Figure 2:
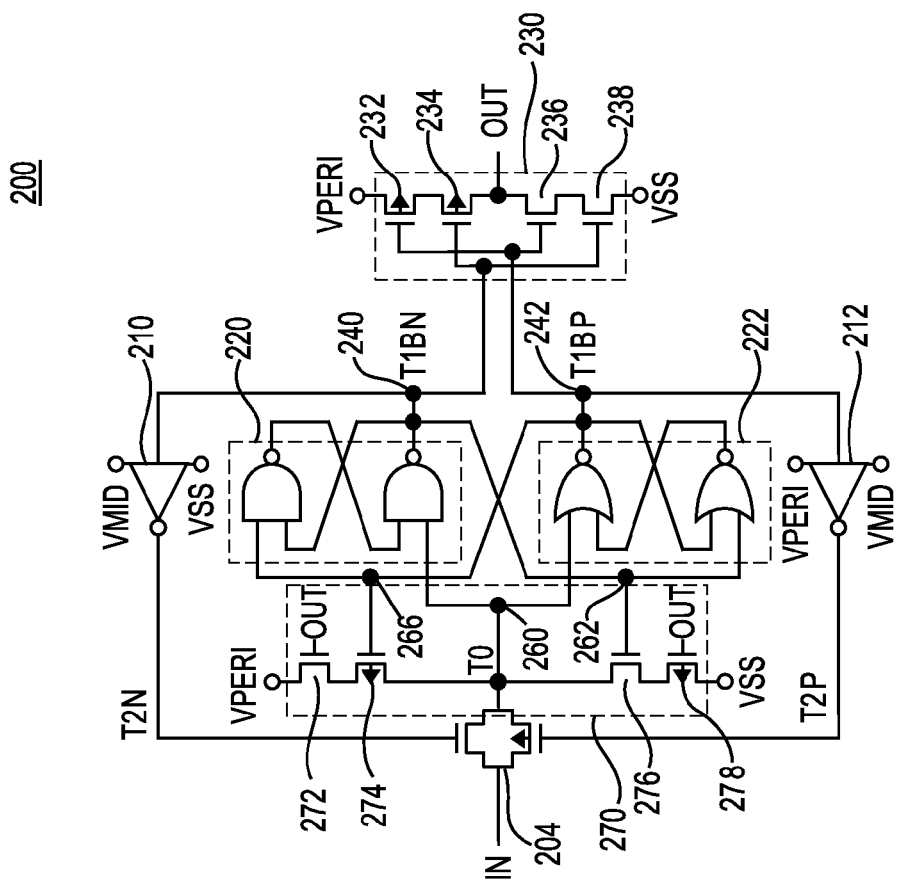
FIG. 2 is a schematic diagram of keeper circuit according to an embodiment of the disclosure.

FIG. 2 is a schematic diagram of an exemplary keeper circuit 200 according to an embodiment of the disclosure. The keeper circuit 200 may include a transfer gate 204 coupled to a first driver circuit 270 that includes transistors 272, 274, 276, and 278 coupled in series. A signal T0 is driven from the driver circuit to a node 260 that is coupled to an SRB latch 220 and an SR latch 222. The SRB latch 220 may provide the T1BN signal to a node 240 and the SR latch 222 may provide the TIB_P signal to the node 242. The keeper circuit 200 may further include a second driver circuit 230 that includes transistors 232, 234, 236, and 238 coupled in series and is configured to drive an output signal OUT. The keeper circuit 200 may be implemented in either or both of the keepers 110(A-B) and/or either or both of the keepers 140(AB) of FIG. 1.

The transfer gate 204 is configured to receive an input signal IN (e.g., the RWBS_A/B line voltage from FIG. 1), and to provide the T0 signal based on the IN signal responsive to the T2N and T2P signals. The T2N/P signals are inverted T1BN/P signals. The logic level of the T2N signal may vary between a VSS voltage (e.g., a low logic level) and a VMID voltage (e.g., a mid-range level). The logic level of the T2P signal may vary between a VPERI voltage (e.g., a high logic level) and the VMID voltage. When the T2N signal has the mid-range level (e.g., T0 has a high logic level), the T2P signal has the high logic level, and when the T2N signal has the low logic level (e.g., T0 has a low logic level), the T2P signal has the mid-range level. By providing the mid-range level to one of the transistors of the transfer gate 204 in this manner (e.g., providing the mid-range level to the p-type transistor when the T0 signal has a low logic level and providing the mid-range level to the n-type transistor when the T0 signal has a high logic level), receiving a mid-range level via the IN signal will not overcome the voltage differential of the transfer gate 204 to change the T0 signal to the mid-range level.

The first driver circuit 270 may receive the T0 signal at a node 260 and may accelerate a transition of the T0 signal when the IN signal transitions to a different (e.g., high or low) logic level. The transistors 272 and 274 may pull the T0 node up to the high logic level responsive to the OUT signal and the T1BP signals, respectively, being inactive (e.g., having a low logic level). The transistors 276 and 278 may pull the T0 signal node down to the low logic level responsive to the OUT signal and the T1BN signals, respectively, being active (e.g., having a high logic level). Because the OUT signal has an opposite logic level of the T1BN/P signals, the first driver 270 may only actively drive the T0 signal value at node 260 when the T1BN/P signals transition in logic level due to a transition of the IN signal, but prior to the OUT signal transitioning responsive to the transition of the T1BN/P signals.

The T0 signal may be provided to the node 260, which is coupled to a set input of the SRB latch 220 and to a reset input of the SR latch 222. The SRB latch 220 and the SR latch 222 may be complementary latches such that the output of the SRB latch 220 when the set input is asserted is equal to the output of the SR latch 222 when the reset value is asserted, and vice versa. Thus, because of the set input of the SRB latch 220 receives the same T0 signal as the reset input of the SR latch 222, the T1BN and the T1BP signals may have a same value. The output of the SR latch 222 may be provided to the node 266, which is coupled to the gate of the transistor 272, to the node 242, and to a set input of the SRB latch 220. The output of the SRB latch 220 may be provided to the node 262, which is coupled to the gate of the transistor 274, to the node 242, and to a reset input of the SR latch 222.

The T1BN/P signals may be provided to the second driver circuit 230, with the T1BP signal provided to the gates of transistors 232 and 236, and the T1BN signal provided to the gate of transistors 234 and 238. The values of the T1BN/P signals may have the same logic level such that the OUT signal is latched at a logic high level or a logic low level. When the IN signal has a high logic level or a low logic level, the OUT signal have the same logic level as the received IN signal.

The inverter 210 may receive the T1BN signal and may drive the T2N signal based on a logic level of the T1BN signal. For example, when the T1BN signal has a low logic level, the T2N signal has the mid-range logic level, and when the T1BN signal has a high logic level, the T2N signal has a low logic level. The inverter 212 may receive the T1BP signal and may drive the T2P signal based on a logic level of the T1BP signal. For example, when the T1BP signal has a low logic level, the T2P signal has the high logic level, and when the T1BP signal has high logic level, the T2P signal has a mid-range level.

Figure 6:
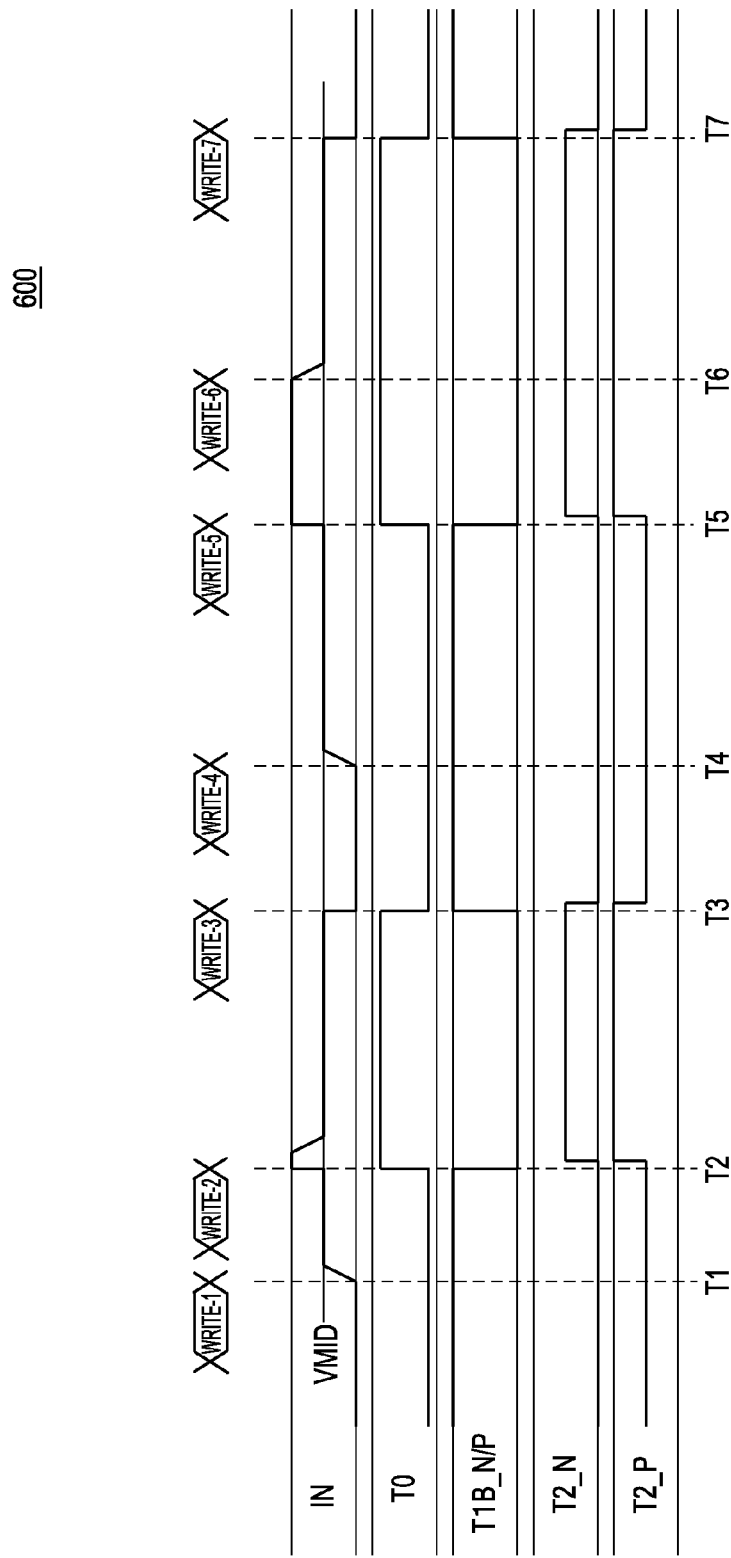
FIG. 6 is a timing diagram depicting an example operation of the keeper circuit according to an embodiment of the disclosure.

FIG. 6 is a timing diagram depicting an example operation of the keeper circuit 200 of FIG. 2 according to an embodiment of the disclosure. Prior to time T1, the transfer gate 204 may provide the T0 having a low logic level responsive to the IN signal having a low logic level. Responsive to the T0 signal having the low logic level, the SRB latch 220 and the SR latch 222 may drive the T1BN/P signals to a high logic level. Responsive to the T1BN/P signals having the high logic levels, the inverter 210 may drive the T2N signal to the low logic level and the inverter 212 may drive the T2P signal to the mid-range level. Also responsive to the T1BN/P signals having the high logic levels, the second driver circuit 230 may drive the OUT signal to the low logic level (not shown in FIG. 6).

Between time T1 and T2, the IN signal may transition to the mid-range level (e.g., due to a charge share). Because the mid-range level too low to overcome the voltage differential necessary to pass through the transfer gate 204, the value of the T0 signal remains unchanged, and thus the values of the other signals remain unchanged. At time T2, the IN signal transitions to a high logic level, and the transfer gate 204 provides the IN signal to transition the T0 signal to the high logic level. Responsive to the T0 signal having the high logic level, the SRB latch 220 and the SR latch 222 may drive the T1BN/P signals to the low logic level. Responsive to the T1BN/P signals having the low logic levels, the inverter 210 may drive the T2N signal to the mid-range level and the inverter 212 may drive the T2P signal to the high logic level. Also responsive to the T1BN/P signals having the low logic levels, the second driver circuit 230 may drive the OUT signal to the high logic level (not shown in FIG. 6). Also responsive to the T1BN/P signals having the low logic levels and prior to the second driver 230 driving the OUT signal to the high logic level, the first driver circuit 270 may drive the T0 signal to the high logic level.

After briefly being held at the high logic level between time T2 and T3, the IN signal may transition to the mid-range level (e.g., due to a charge share). Because the mid-range level exceeds the voltage differential necessary to pass through the transfer gate 204, the value of the T0 signal remains unchanged, and thus the values of the other signals remain unchanged. At time T3, the IN signal transitions to the low logic level, and the transfer gate 204 provides the IN signal to transition the T0 signal to the low logic level. Responsive to the T0 signal having the low logic level, the SRB latch 220 and the SR latch 222 may drive the T1BN/P signals to a high logic level. Responsive to the T1BN/P signals having the high logic levels, the inverter 210 may drive the T2N signal to the low logic level and the inverter 212 may drive the T2P signal to the mid-range level. Also responsive to the T1BN/P signals having the high logic levels, the second driver circuit 230 may drive the OUT signal to the low logic level (not shown in FIG. 6). Also responsive to the T1BN/P signals having the high logic levels and prior to the second driver 230 driving the OUT signal to the low logic level, the first driver circuit 270 may drive the T0 signal to the low logic level.

Between time T4 and T5, the IN signal may transition to the mid-range level (e.g., due to a charge share). Because the mid-range level too low to overcome the voltage differential necessary to pass through the transfer gate 204, the value of the T0 signal remains unchanged, and thus the values of the other signals remain unchanged. At time T5, the IN signal transitions to a high logic level, and the transfer gate 204 provides the IN signal to transition the T0 signal to the high logic level. Responsive to the T0 signal having the high logic level, the SRB latch 220 and the SR latch 222 may drive the T1BN/P signals to the low logic level. Responsive to the T1BN/P signals having the low logic levels, the inverter 210 may drive the T2N signal to the mid-range level and the inverter 212 may drive the T2P signal to the high logic level. Also responsive to the T1BN/P signals having the low logic levels, the second driver circuit 230 may drive the OUT signal to the high logic level (not shown in FIG. 6). Also responsive to the T1BN/P signals having the low logic levels and prior to the second driver 230 driving the OUT signal to the high logic level, the first driver circuit 270 may drive the T0 signal to the high logic level.

Between times T6 and T7, the IN signal may transition to the mid-range level (e.g., due to a charge share). Because the mid-range level too exceeds the voltage differential necessary to pass through the transfer gate 204, the value of the T0 signal remains unchanged, and thus the values of the other signals remain unchanged. At time T7, the IN signal transitions to the low logic level, and the transfer gate 204 provides the IN signal to transition the T0 signal to the low logic level. Responsive to the T0 signal having the low logic level, the SRB latch 220 and the SR latch 222 may drive the T1BN/P signals to a high logic level. Responsive to the T1BN/P signals having the high logic levels, the inverter 210 may drive the T2N signal to the low logic level and the inverter 212 may drive the T2P signal to the mid-range level. Also responsive to the T1BN/P signals having the high logic levels, the second driver circuit 230 may drive the OUT signal to the low logic level (not shown in FIG. 6). Also responsive to the T1BN/P signals having the high logic levels and prior to the second driver 230 driving the OUT signal to the low logic level, the first driver circuit 270 may drive the T0 signal to the low logic level.

Figure 3:
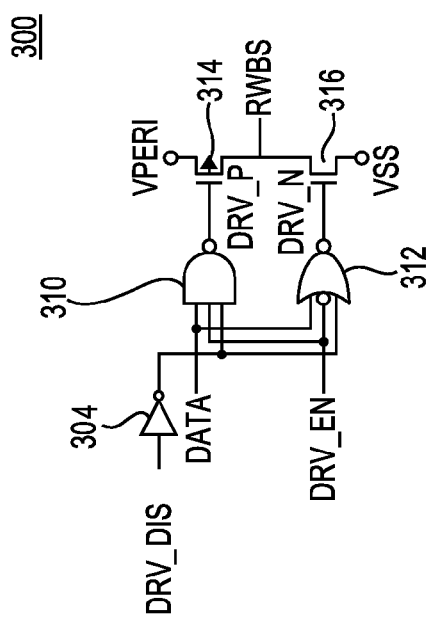
FIG. 3 is a schematic diagram of an exemplary RWBS driver according to an embodiment of the disclosure.

FIG. 3 is a schematic diagram of an exemplary RWBS driver 300 according to an embodiment of the disclosure. The RWBS driver 300 may be included in either or both of the RWBS drivers 104(A-B) of FIG. 1. The RWBS driver 300 may include a NAND gate 310 coupled to a transistor 314 and a NOR gate 312 coupled to a transistor 316. The transistor 314 may be coupled in series with the transistor 316 and a node between the transistor 314 and the transistor 316 may be coupled to a RWBS line. The RWBS driver 300 may be configured to drive the RWBS line when a previously driven data signal DRV_DIS and a data signal DATA have inverted (e.g., opposite) logic levels.

The NAND gate 310 may receive an inverted DRV_DIS signal via the inverter 304, the DATA signal, and a driver enable signal DRV_EN. The NAND gate 310 may provide a first driver signal DRV_P having a value based on the inverted DRV_DIS signal, the DATA signal, and the DRV_EN signal to the gate of the transistor 314. The NOR gate 312 may receive the inverted DRV_DIS signal, the DATA signal, and an inverted DRV_EN signal. The NOR gate 312 may provide a second driver signal DRV_N having a value based on the inverted DRV_DIS signal, the DATA signal, and the inverted DRV_EN signal to the gate of the transistor 316. When the inverted DRV_EN signal is active, the NAND gate 310 may provide the DRV_P signal having a low logic level when the DATA signal and the inverted DRV_DIS signal both have a high logic levels. Otherwise, the NAND gate 310 may provide the DRV_P signal having a high logic level. Also when the DRV_EN signal is active, the NOR gate 312 may provide the DRV_N signal having a high logic level when the DATA signal and the inverted DRV_DIS signal both have a low logic levels. Otherwise, the NOR gate 312 may provide the DRV_P signal having a low logic level. The transistor 314 may drive the RWBS signal to a high logic level responsive to the DRV_P signal having the low logic level, and the transistor 316 may drive the RWBS signal to a low logic level responsive to the DRV_N signal having a high logic level.

Figure 4:
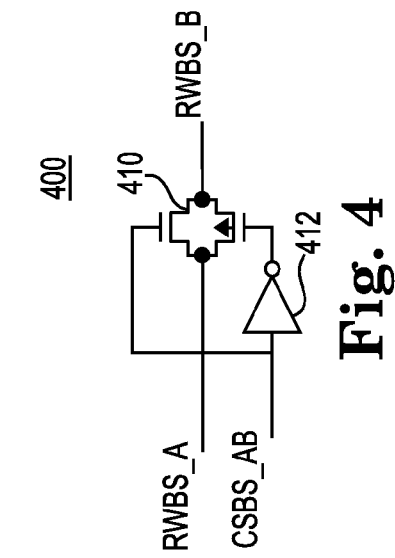
FIG. 4 is a schematic diagram of an exemplary charge share circuit according to an embodiment of the disclosure.

FIG. 4 is a schematic diagram of an exemplary charge share circuit 400 according to an embodiment of the disclosure. The charge share circuit 400 may be included in the charge share circuit 130 of FIG. 1. The charge share circuit 400 may include a transfer gate 410 configured to couple an RWBS_A line to an RWBS_B line responsive to a charge share control signal CSBS_AB (e.g., as part of a charge share operation). An inverter 412 may invert the CSBS_AB signal and provide the inverted CSBS_AB signal to a p-type transistor of the transfer gate 410. An n-type transistor of the transfer gate 410 may receive the CSBS_AB signal. Responsive to the CSBS_AB signal having a high logic level, the transfer gate 410 may couple the RWBS_A line to the RWBS_B line. Responsive to the CSBS_AB signal having a low logic level, the transfer gate 410 may decouple the RWBS_A line from the RWBS_B line.

Figure 5:
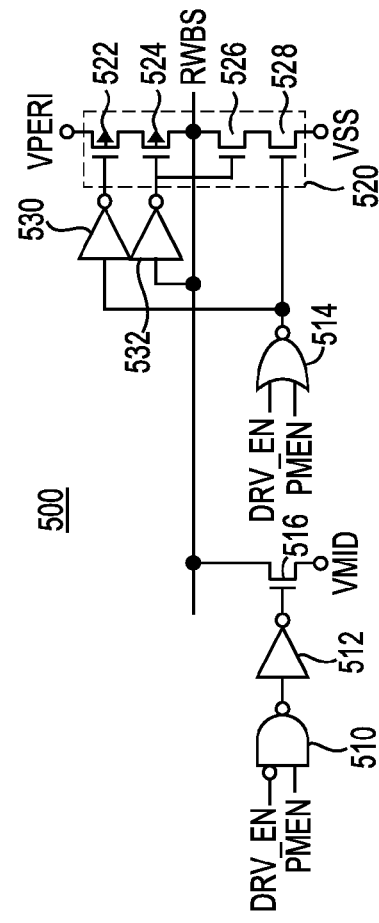
FIG. 5 is a block diagram of an exemplary bus keeper according to an embodiment of the disclosure.

FIG. 5 is a block diagram of an exemplary bus keeper 500 according to an embodiment of the disclosure. The bus keeper 500 may be included in the either or both of the bus keeper 120(A-B) of FIG. 1. The bus keeper 500 may be configured to maintain the RWBS line at a previously driven value or logic level. The bus keeper 500 may include a transistor 516 coupled between the RWBS line and a mid-range level VMID. The bus keeper 500 may further a NAND gate 510 configured to activate the transistor 516 via an inverter 512. The bus keeper 500 may further include a 520 configured to drive a logic level of the RWBS line based on a current logic level of the RWBS line and an output from a NOR gate 514.

The NAND gate 510 may receive an inverted driver enable signal DRV_EN and a charge share enable signal PMEN, and may provide an output based on values of the inverted DRV_EN signal and the PMEN signal. The NAND gate 510 may provide a low logic level to the inverter 512 when the DRV_EN signal has a low logic level and the PMEN signal has a high logic level, such as when a charge share is enabled and a driver enable is disabled. Otherwise, the NAND gate 510 may provide a high logic level to the inverter 512. Responsive to the low logic level output from the NAND gate 510 and inverted to a high logic level via the inverter 512, the transistor 516 may couple the VMID signal to the RWBS line to hold the RWBS line at the VMID voltage.

The NOR gate 514 may receive the DRV_EN signal and the PMEN signal, and may provide an output based on values of the DRV_EN signal and the PMEN signal to transistor 522 (via inverter 530) and transistor 528 of the 520. The NOR gate 514 may provide a high logic level to the inverter 512 when both the DRV_EN signal and the PMEN signal have low logic levels, such as when no charge share has been enabled and the driver enable is disabled. Otherwise, the NOR gate 514 may provide a low logic level to the transistors 522 (via inverter 530) and 528 of the 520. Transistor 524 (via inverter 532) and transistor 526 may receive current level of the RWBS line. Thus, responsive to the NOR gate 514 providing a high logic level, the 520 may maintain a previous value of the RWBS. Responsive to the NOR gate 514 providing a low logic value, the 520 may be disabled to allow another circuit to set a value of the RWBS bus.

Figure 7:
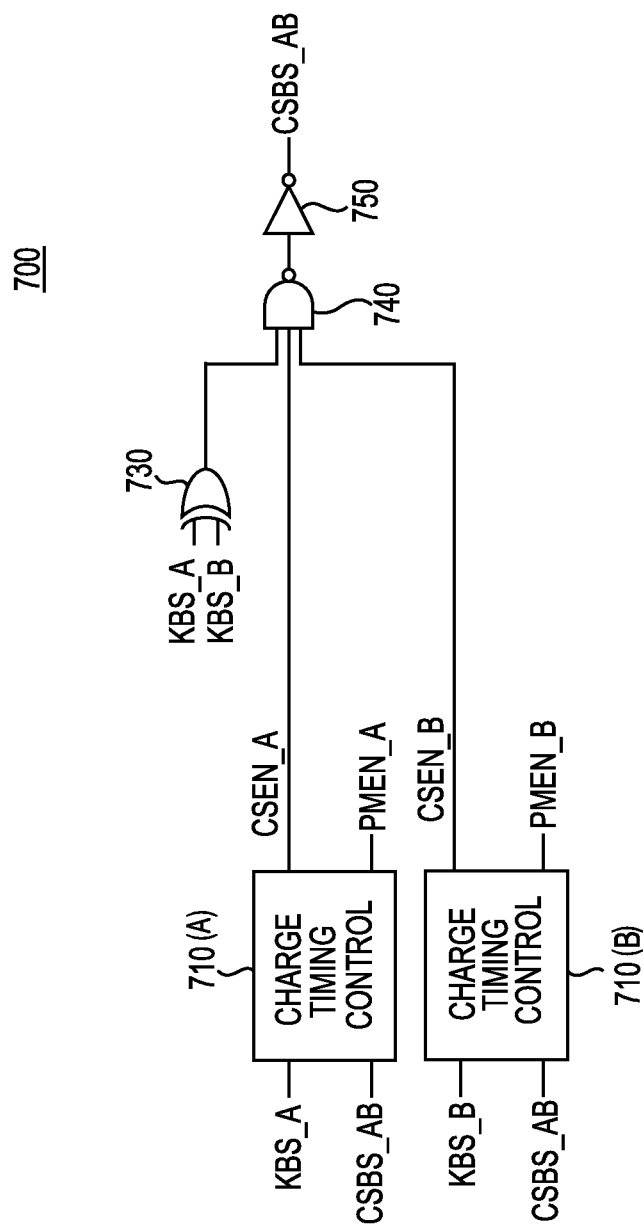
FIG. 7 is a block diagram of an exemplary charge share control circuit according to an embodiment of the disclosure.

FIG. 7 is a block diagram of an exemplary charge share control circuit 700 according to an embodiment of the disclosure. The charge share control circuit 700 may be included in the charge share control circuit 132 of FIG. 1. The charge share control circuit 700 may be configured to determine when to activate a charge share between RWBS lines based on values of the RWBS lines based on the relative logic levels of the RWBS lines. For example, the charge share control circuit 700 may assert the charge share control signal CSBS_AB responsive to transition of keeper latch signals KBS_A/B when the KBS_A/B have inverted logic values. The charge share control circuit 700 may include charge timing control circuits 710(A-B) each configured to detect transition of a logic level of the respective KBS_A/B signal and to provide respective charge share enable signal CSEN_A/B to a NAND gate 740 responsive to transition of the logic level of the respective KBS_A/B signal. A XOR gate 730 may also provide an output signal to the NAND gate 740 based on values of the KBS_A/B signals. The NAND gate 740 may provide an output to an inverter 750, which may provide the charge share control signal CSBS_AB.

Each of the 710(A-B) may detect transitions of the respective KBS_A/B signal and may set and reset logic levels of the respective CSEN_A/B and PMEN_A/B signals responsive to transitions of the logic level of the respective KBS_A/B signals and a transition of the CSBS_AB signal. The XOR gate 730 may provide a high logic level output when the KBS_A and KBS_B signals have inverted logic levels. Otherwise, the XOR gate 730 may provide a low logic level. The NAND gate 740 may output a low logic level responsive to the CSEN_A and the CSEN_B signals having a high logic level and the XOR gate 730 providing a high logic level (e.g., the KBS_A and KBS_B signals having inverted logic level values). Otherwise, the NAND gate 740 may provide a high logic level. The output of the NAND gate 740 may be inverted via the inverter 750 to provide the CSBS_AB signal. The CSBS_AB signal may be fed back into each of the charge timing control circuits 710(A-B), and responsive to the CSBS_A/B signal transitioning to the high logic level, each of the charge timing control circuits 710(A-B) reset the respective CSEN_A/B signal to a low logic level. By resetting the respective CSEN_A/B signals to low logic levels, the NAND gate 740 and the inverter 750 may reset the CSBS_AB signal to a low logic level. Thus, the CSBS_AB signal may be a short pulse that enables the charge share between the RWBS_A/B lines.

Figure 8:
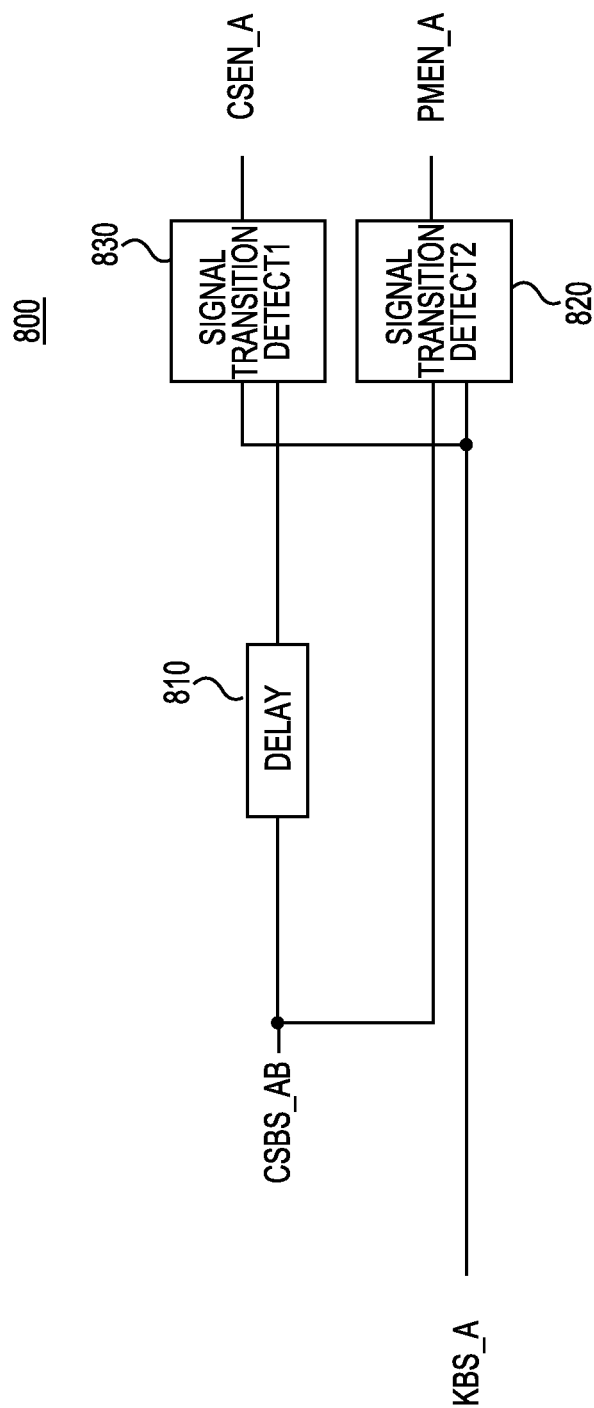
FIG. 8 is a block diagram of an exemplary charge timing control according to an embodiment of the disclosure.

FIG. 8 is a block diagram of an exemplary charge timing control 800 according to an embodiment of the disclosure. The charge timing control 800 may be included in the charge timing control circuit 710(A) of FIG. 7. One of skill in the art would also appreciate that the charge timing control 800 could be modified to be implemented in the charge timing control circuit 710(B) of FIG. 7 by receiving and providing the respective "B" signals (e.g., KBS_B, CSEN_B, and PMEN_B signals). The charge timing control 800 may be configured to detect transition of the KBS_A signal and the CSBS_AB signal to set the CSEN_A and PMEN_A signals. The charge timing control 800 may include a first signal transition detect circuit 830 configured to receive a KBS_A signal and a CSBS_AB signal via a delay 810. The first signal transition detect circuit 830 may be configured to provide the CSEN_A signal having a logic level based on detection of transition of the CSBS_AB and KBS_A signals. The charge timing control 800 may further include a second signal transition detect circuit 820 configured to receive the KBS_A signal and the CSBS_AB signal. The second signal transition detect circuit 820 may be configured to provide the CSEN_A signal having a logic level based on detection of transition of the CSBS_AB and KBS_A signals.

Figure 9:
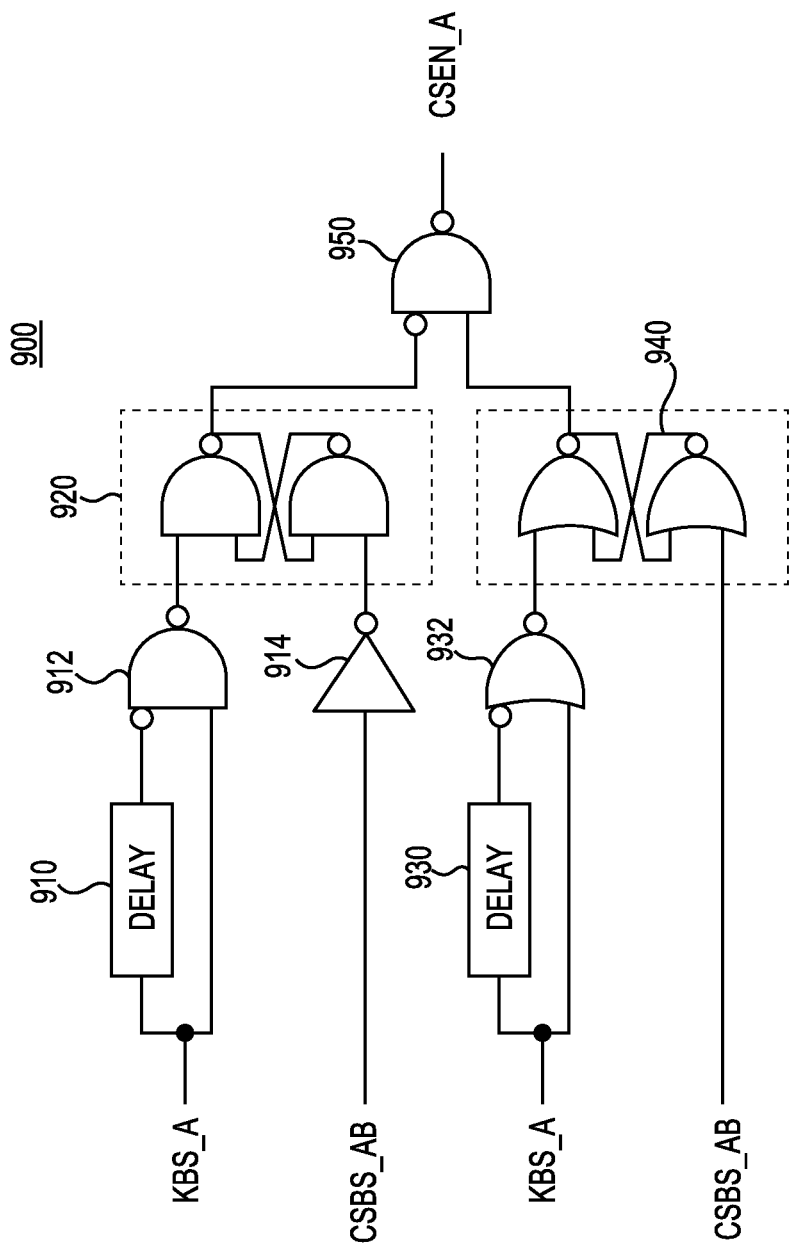
FIG. 9 is a schematic diagram of an exemplary first signal transition detect circuit according to an embodiment of the disclosure.

FIG. 9 is a schematic diagram of an exemplary first signal transition detect circuit 900 that may be used to implement the first signal transition detect circuit 830 of FIG. 8. The first signal transition detect circuit 900 may include a SRB latch 920 and a SR latch 940 configured to detect a transition of the KBS_A signal and to provide an indication of the transition to a NAND gate 950. The NAND gate 950 may be configured to provide the CSEN_A signal.

The SRB latch 920 may detect (e.g., indicated by setting an output to a low logic value) a transition of the KBS_A signal from a low logic level to a high logic level (e.g., via the delay 910 and the NAND gate 912) and to be reset the output to a high logic level value responsive to a transition of the CSBS_AB signal from a low logic level to a high logic level. That is, the NAND gate 912 may provide a low pulse (e.g., length set by the delay 910) to the SRB latch 920 when the KBS_A signal transitions from low to high, and the output of the SRB latch 920 may transition to a high logic level. Responsive to the high logic level from the SRB latch 920 (inverted to a low logic level at the input of the NAND gate 950), the NAND gate 950 may set the CSEN_A signal to a high logic level.

The SR latch 940 may detect (e.g., indicated by setting an output to a high logic value) a transition of the KBS_A signal from a high logic level to a low logic level (e.g., via the delay 930 and the NOR gate 932) and to be reset the output to a low logic level value responsive to a transition of the CSBS_AB signal from a low logic level to a high logic level. That is, the NOR gate 932 may provide a low pulse (e.g., length set by the delay 930) to the SR latch 940 when the KBS_A signal transitions from high to low, and the output of the SR latch 940 may transition to a low logic level. Responsive to the low logic level from the SR latch 940, the NAND gate 950 may set the CSEN_A signal to a high logic level. Thus, the first signal transition detect circuit 900 may be configured to set the CSEN_A signal to a high logic level responsive to detecting a transition of the KBS_A signal from one logic level to an opposite logic level and to be reset responsive to a transition of the CSBS_AB signal.

Figure 10:
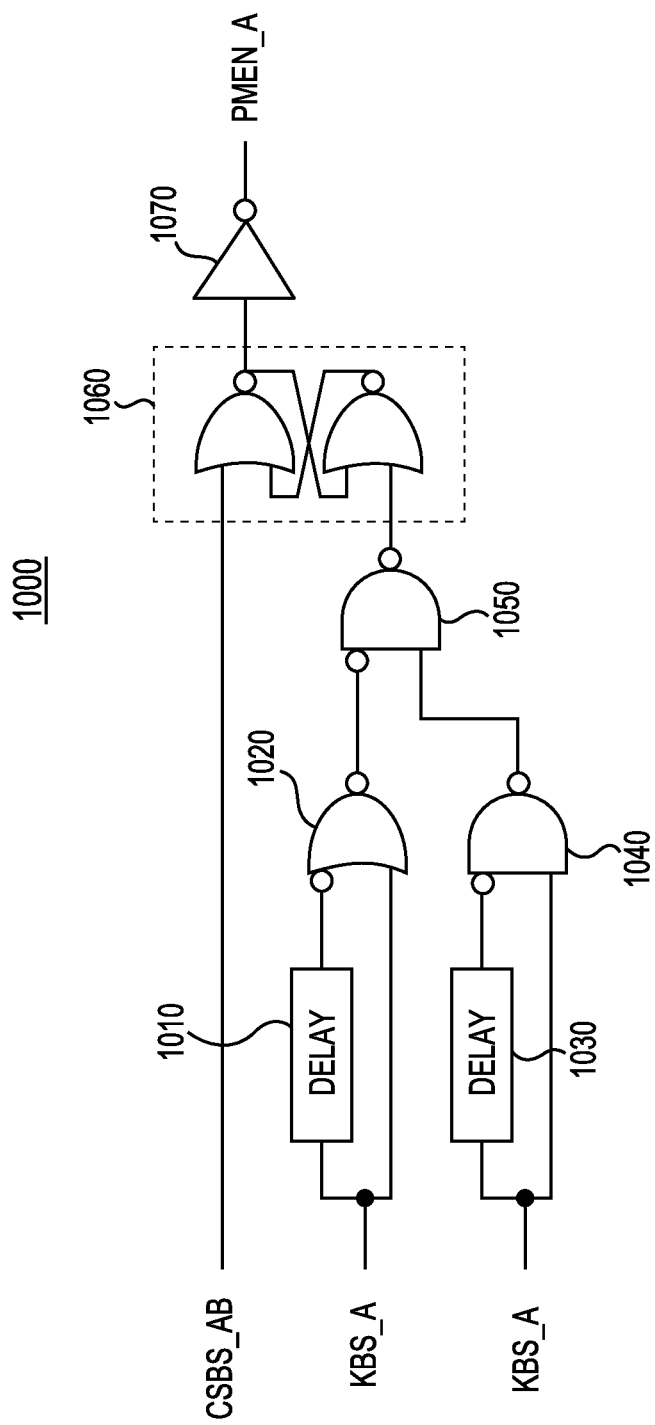
FIG. 10 is a schematic diagram of an exemplary second signal transition detect circuit according to an embodiment of the disclosure.

FIG. 10 is a schematic diagram of an exemplary second signal transition detect circuit 1000 that may be used to implement the second signal transition detect circuit 820 of FIG. 8. The second signal transition detect circuit 1000 may include a SR latch 1060 that is configured to detect (e.g., indicated by setting an output to a low logic value) a transition of the CSBS_AB signal from a low logic level to a high logic level and to be reset to a low logic level responsive to any transition of the KBS_A signal (e.g., via the delay 1010, NOR gate 1020, delay 1030, NAND gate 1040 and 1050). For example, based on the inverted logic levels at the inputs, the NOR gate 1020 may provide a low logic level and the NAND gate 1040 may provide a high logic level and the 1050 may provide a low logic level based on the inverted output of the NOR gate 1020 (e.g., high logic level) and the output (e.g., high logic level) of the NAND gate 1040. Responsive to a transition of the KBS_A signal from a low logic level to a high logic level, the NAND gate 1040 may provide a low logic level pulse (e.g., length set by the delay 1030) to the 1050, and the 1050 may provide a high logic level pulse to the SR latch 1060 to reset the output to a low logic level. The inverter 1070 may invert the output to provide the PMEN_A signal having a high logic level. Responsive to a transition of the KBS_A signal from a high logic level to a low logic level, the NOR gate 1020 may provide a high logic level pulse (e.g., length set by the delay 1010) to the 1050, and the 1050 may provide a high logic level pulse to the SR latch 1060 to reset the output to a high logic level. The inverter 1070 may invert the output to provide the PMEN_A signal having a low logic level.

Figure 11:
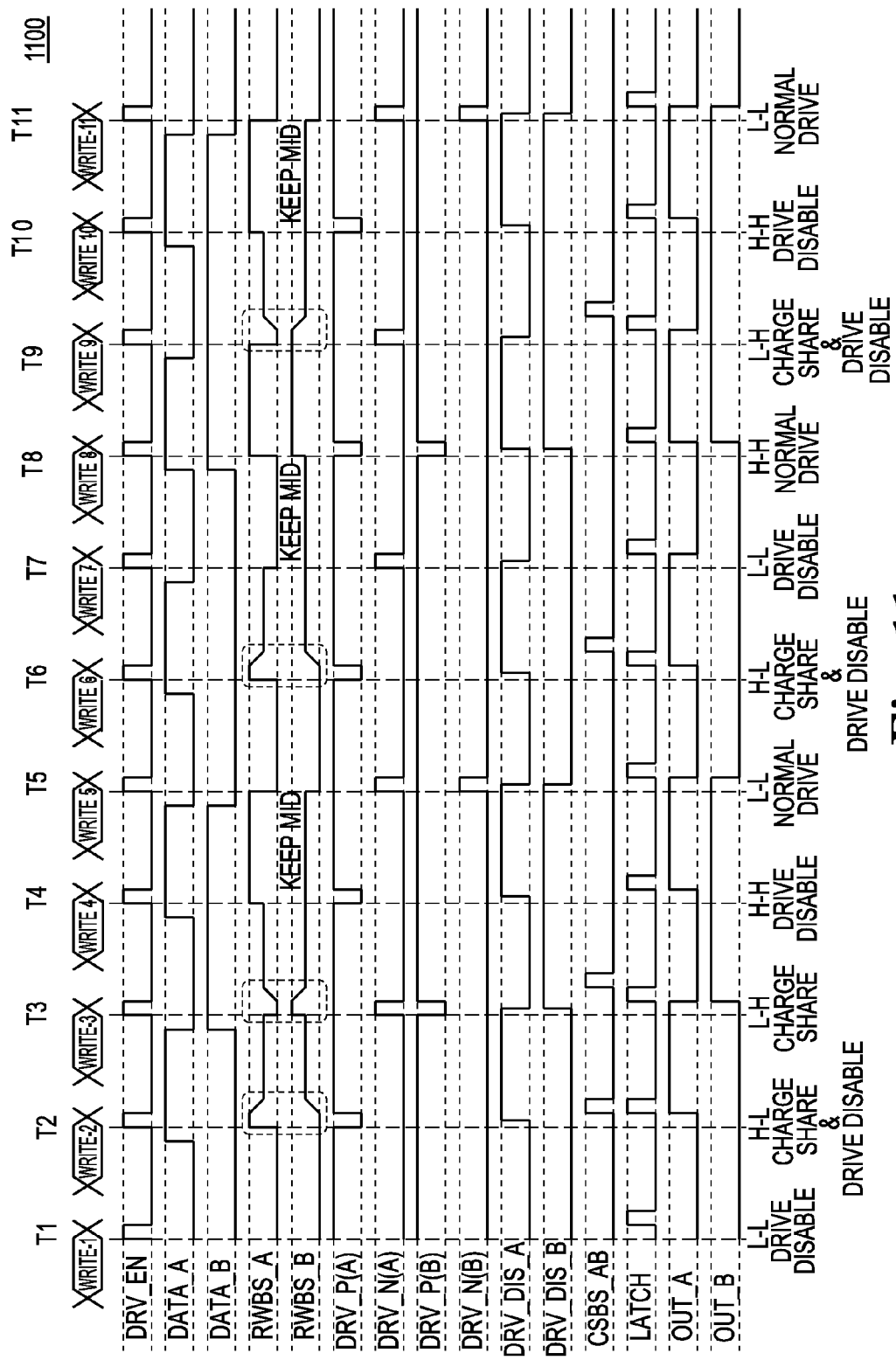
FIG. 11 is an exemplary timing diagram depicting various scenarios for charge sharing and drive disabling according to an embodiment of the disclosure.

FIG. 11 is an exemplary timing diagram depicting various scenarios for charge sharing and drive disabling according to an embodiment of the disclosure. The signals depicted in FIG. 11 may correspond to the signals having the same names in FIGS. 1 and 3. At time T1, both RWBS_A and RWBS_B are low logic levels, thus no charge sharing occurs. Further, because DRV_DIS_A and DATA_A are low logic levels, driving of the RWBS_A line to the low logic level of DATA_A is disabled (e.g., via the RWBS driver 104(A) of FIG. 1 and the RWBS driver 300 of FIG. 3). In addition, because DRV_DIS_B and DATA_B are low logic levels, driving of the RWBS_B line to the low logic level of DATA_B is disabled (e.g., via the RWBS driver 104(B) of FIG. 1 and the RWBS driver 300 of FIG. 3).

At time T2, DATA_A is a high logic level and thus the RWBS_A line is driven to the high logic level responsive to the DRV_P(A) signal. In addition, because DRV_DIS_B and DATA_B are low logic levels, driving of the RWBS_B line to the low logic level of DATA_B is disabled. The RWBS_A and B lines now have inverted logic levels, and thus a charge share is initiated via the asserted CSBS_AB signal (e.g., via the charge share control circuit 132 of FIG. 1) to transition the RWBS_A and B lines to a mid-range level (e.g., via the charge share circuit 130 of FIG. 1).

At time T3, DATA_A has a low logic level and thus the RWBS_A line is driven to the low logic level responsive to the DRV_N(A) signal. DATA_B has a high logic level and thus the RWBS_B line is driven to the high logic level responsive to the DRV_P(B) signal. The RWBS_A and B lines now have inverted logic levels, and thus a charge share is initiated via the asserted CSBS_AB signal (e.g., via the charge share control circuit 132 of FIG. 1) to transition the RWBS_A and B lines to a mid-range level (e.g., via the charge share circuit 130 of FIG. 1).

At time T4, DATA_A has a high logic level and thus the RWBS_A line is driven to the high logic level responsive to the DRV_P(A) signal. DATA_B has a high logic level and the RWBS_B signal has a mid-range level, however the previous value of DATA_B was a high logic level. Thus, driving of the RWBS_B line to the high logic level of DATA_B is disabled. Further, because RWBS_A and RWBS_B are not inverted logic levels, no charge sharing is initiated.

At time T5, DATA_A has a low logic level and thus the RWBS_A line is driven to the low logic level responsive to the DRV_N(A) signal. DATA_B has a low logic level and thus the RWBS_B line is driven to the low logic level responsive to the DRV_N(B) signal. Further, because RWBS_A and RWBS_B are not inverted logic levels, no charge sharing is initiated.

At time T6, DATA_A is a high logic level and thus the RWBS_A line is driven to the high logic level responsive to the DRV_P(A) signal. In addition, because DRV_DIS_B and DATA_B are low logic levels, driving of the RWBS_B line to the low logic level of DATA_B is disabled. The RWBS_A and B lines now have inverted logic levels, and thus a charge share is initiated via the asserted CSBS_AB signal to transition the RWBS_A and B lines to a mid-range level.

At time T7, DATA_A has a low logic level and thus the RWBS_A line is driven to the low logic level responsive to the DRV_N(A) signal. In addition, because DRV_DIS_B and DATA_B are low logic levels, driving of the RWBS_B line to the low logic level of DATA_B is disabled. Further, because RWBS_A and RWBS_B are not inverted logic levels, no charge sharing is initiated.

At time T8, DATA_A has a high logic level and thus the RWBS_A line is driven to the high logic level responsive to the DRV_P(A) signal. DATA_B has a high logic level and thus the RWBS_B line is driven to the low logic level responsive to the DRV_P(B) signal. Further, because RWBS_A and RWBS_B are not inverted logic levels, no charge sharing is initiated.

At time T9, DATA_A is a low logic level and thus the RWBS_A line is driven to the low logic level responsive to the DRV_N(A) signal. In addition, because DRV_DIS_B and DATA_B are high logic levels, driving of the RWBS_B line to the high logic level of DATA_B is disabled. The RWBS_A and B lines now have inverted logic levels, and thus a charge share is initiated via the asserted CSBS_AB signal to transition the RWBS_A and B lines to a mid-range level.

At time T10, DATA_A has a high logic level and thus the RWBS_A line is driven to the high logic level responsive to the DRV_P(A) signal. DATA_B has a high logic level and the RWBS_B signal has a mid-range level, however the previous value of DATA_B was a high logic level. Thus, driving of the RWBS_B line to the high logic level of DATA_B is disabled. Further, because RWBS_A and RWBS_B are not inverted logic levels, no charge sharing is initiated.

At time T11, DATA_A has a low logic level and thus the RWBS_A line is driven to the low logic level responsive to the DRV_N(A) signal. DATA_B has a low logic level and thus the RWBS_B line is driven to the low logic level responsive to the DRV_N(B) signal. Further, because RWBS_A and RWBS_B are not inverted logic levels, no charge sharing is initiated.

The timing diagram 1100 of FIG. 11 is exemplary to show interplay between signals in the apparatus 100 of FIG. 1. One of skill in the art would recognize that the data sequence may vary from depicted, and the relative timing of the signals may vary.

Figure 12:
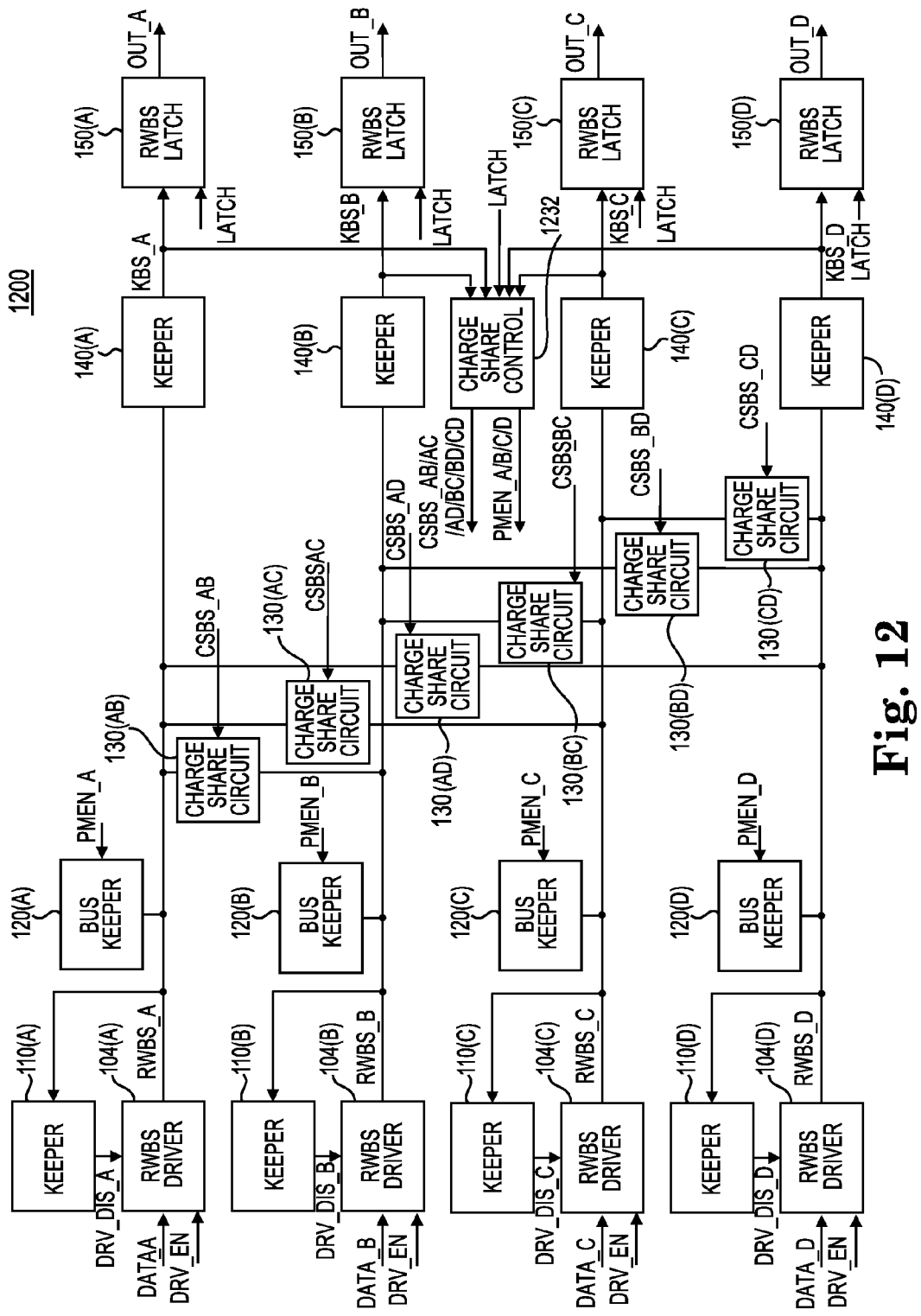
FIG. 12 is a block diagram of an apparatus including charge share circuits charge share circuits according to an embodiment of the disclosure.

FIG. 12 is a block diagram of an apparatus 1200 including charge share circuits charge share circuits 130(AB-CD) configured to share charge between read/write data lines RWBS based on relative levels (e.g., voltages) of the data lines according to an embodiment of the disclosure. The apparatus 1200 may include a first RWBS line RWBS_A, a second RWBS line RWBS_B, a third RWBS line RWBS_C, and a fourth RWBS line RWBS_D. A first end of the RWBS_A/B/C/D lines may be coupled to a respective RWBS driver 104 (A-D) and a respective keepers 110(A-D). A second end of each of the RWBS_A/B/C/D lines is coupled to a respective keepers 140(A-D) in series with a respective RWBS latches 150(A-D). The apparatus 100 may further include a charge share control circuit 1232 configured to control charge sharing via the charge share circuits 130(AB-CD). The apparatus 100 may further include a bus keeper 120(A-D) coupled to respective RWBS_A/B/C/D lines between the first end and the second end. The apparatus 1200 may include elements that have been previously described with respect to the apparatus 100 of FIG. 1. Those elements have been identified in FIG. 12 using the same reference numbers used in FIG. 1 and operation of the common elements is as previously described. Consequently, a detailed description of the operation of these particular elements will not be repeated in the interest of brevity.

The apparatus 1200 having four RWBS_A/B/C/D lines presents a number of charge sharing opportunities. Thus, the charge share control circuit 1232 may control priority and timing of charge sharing between pairs of the RWBS_A/B/C/D lines.

The charge share control circuit 1232 may receive the KBS_A/B/C/D signals from the keepers 140(A-D), and may provide a charge share control signals CSBS_AB/AC/AD/BC/BD/CD to the charge share circuits 130(AB-CD). Because the charge sharing is limited to sharing charge between pairs of RWBS_A/B/C/D lines, the charge share control circuit 1232 may only assert mutually exclusive CSBS_AB/AC/AD/BC/BD/CD signals at the same time. Thus, no more than two of the CSBS_AB/AC/AD/BC/BD/CD signals may be asserted at a given time. The mutually exclusive pairs may include: CSBS_AB and CSBS_CD, CSBS_AC and CSBS_BD, CSBS_AD and CSBS_BC. The charge share control circuit 1232 may assert the CSBS_AB/AC/AD/BC/BD/CD signals responsive to each of the two associated KSBS_A/B/C/D signals transitioning to opposite (e.g., inverted) logic levels. Responsive to the CSBS_AB/AC/AD/BC/BD/CD signals being asserted, the respective charge share circuits 130(AB-CD) may couple the respective RWBS_A/B/C/D line pair together to perform a charge sharing operation.

In operation, when a pair of the RWBS_A/B/C/D lines have inverted logic levels, the respective charge share circuits 130(AB-CD) may couple the pair of RWBS_A/B/C/D lines together to charge share across the lines responsive the respective CSBS_AB/AC/AD/BC/BD/CD signal set by the charge share control circuit 1232. If more than two pair of the RWBS_A/B/C/D lines have inverted logic levels, the charge share control circuit 1232 may process the pairs in a defined order priority such that a single the RWBS_A/B/C/D line is coupled to no more than one other RWBS_A/B/C/D line at a given time. The charge share control circuit 1232 may detect whether inverted logic levels between the pairs of the RWBS_A/B/C/D lines based on the KBS_A/B/C/D signals received from the respective keepers 140(A-D) and may activate the respective CSBS_AB/AC/AD/BC/BD/CD signal when the inverted logic levels are detected as a result of a transition of one of the KBS_A/B/C/D. When a charge share occurs, the voltages of the pair of RWBS_A/B/C/D lines equalizes at a mid-range level between a low logic level and a high logic level.

Figure 13:
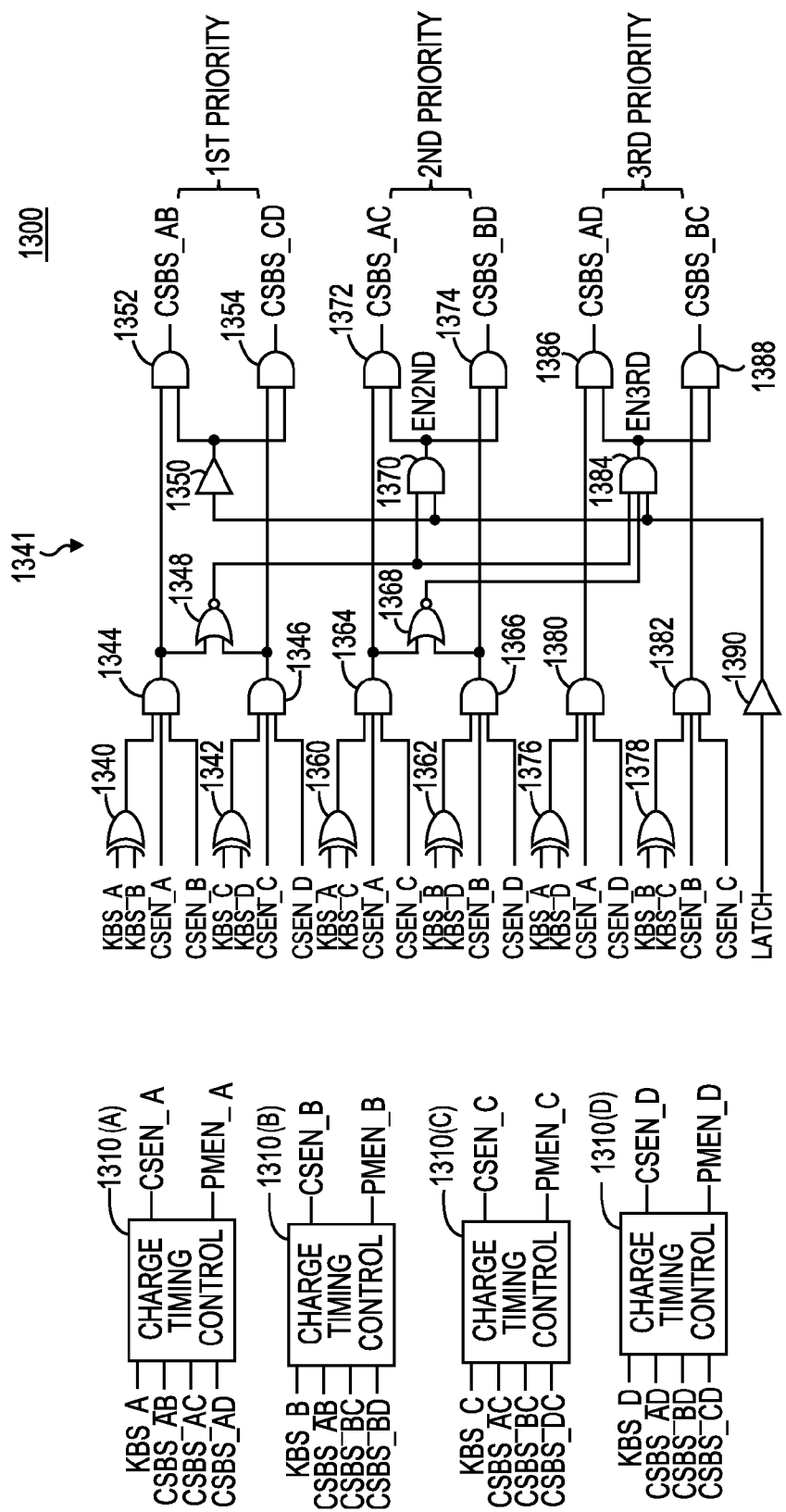
FIG. 13 is a block diagram of an exemplary charge share control circuit according to an embodiment of the disclosure.

FIG. 13 is a block diagram of an exemplary charge share circuit 1300 according to an embodiment of the disclosure. The charge share control circuit 1300 may be included in the charge share control circuit 1232 of FIG. 12. The charge share control circuit 1300 may include charge timing control circuits 1310(A-D) and a priority circuit 1341. Each of the charge timing control circuits 1310(A-D) may receive a respective KBS_A/B/C/D signal and associated CSBS_AB/AC/AD/BC/BD/CD signals, may provide a respective CSEN_A/B/C/D and PMEN_A/B/C/D signals, and be configured to determine when to activate a charge share between RWBS lines based on values of the RWBS lines. Similar to the charge timing control circuits 710(A-B) of FIG. 7, each respective charge timing control circuits 1310(A-D) may set and reset the respective CSEN_A/B/C/D signal and PMEN_A/B/C/D signal responsive to transition of the respective KBS_A/B/C/D signal and transition of one of the respective CSBS_AB/AC/AD/BC/BD/CD signals.

Responsive to the KBS_A/B/C/D signals and the CSEN_A/B/C/D signals, the 1341 may assert the CSBS_AB/AC/AD/BC/BD/CD signals based on a priority. The XOR gates 1340, 1342, 1360, 1362, 1376, and 1378 may determine whether the respective input pairs of the KBS_A/B/C/D have inverted logical levels. The AND gates 1340, 1342, 1360, 1362, 1376, and 1378 may determine whether the output of the respective XOR gate 1344, 1346, 1364, 1366, 1380, and 1382 is asserted and the respective pair of CSEN_A/B/C/D signals are asserted. The outputs of the AND gates 1344, 1346, 1364, 1366, 1380, and 1382 indicate whether an associated pair of RWBS_A/B/C/D lines are candidates for charge sharing. The remainder of the gates may be used to assign the charge sharing by asserting the CSBS_AB/AC/AD/BC/BD/CD signals according to a priority. The NOR gate 1348 and the NOR gate 1368 may be used to determine the priority. For example, if the output of either the XOR gates 1340 or 1342 is asserted (e.g., indicating charge sharing is applicable between the RWBS_A and B lines and/or the RWBS_C and D lines), the NOR gate 1348 may provide a low logic level as the output signal to the AND gate 1370 and the AND gate 1384, which may force the EN2ND and EN3RD signals, respectively, to a low logic level to prevent charge sharing signals CSBS_AC/AD/BC/BD from being asserted. Further, if the output of either the XOR gates 1360 or 1362 is asserted (e.g., indicating charge sharing is applicable between the RWBS_A and C lines and/or the RWBS_B and D lines), the NOR gate 1368 may provide a low logic level as the output signal to the AND gate 1384, which may force the EN3RD signal to a low logic level to prevent charge sharing signals CSBS_AD/BC from being asserted.

The AND gate 1352 may set the CSBS_AB signal to the logic level of the output of the AND gate 1344 responsive to the LATCH signal. The AND gate 1354 may set the CSBS_CD signal to the logic level of the output of the AND gate 1346 responsive to the LATCH signal. The EN2ND signal is based on the output of the NOR gate 1348 and also on the latch signal. Thus, as long as the output of the NOR gate 1348 has a high logical level, the AND gate 1372 may set the CSBS_AC signal to the logic level of the output of the 1364 responsive to the LATCH signal, and the AND gate 1374 may set the CSBS_BD signal to the logic level of the output of the AND gate 1366 responsive to the LATCH signal. The EN3RD signal is based on the output of the NOR gate 1348, the output of the NOR gate 1368, and also on the latch signal. Thus, as long as the output of the NOR gate 1348 and the NOR gate 1368 each have a high logical level, the AND gate 1386 may set the CSBS_AD signal to the logic level of the output of the AND gate 1380 responsive to the LATCH signal, and the AND gate 1388 may set the CSBS_BC signal to the logic level of the output of the 1382 responsive to the LATCH signal. The latch signal may be driven by drivers 1390 and 1350.

Figure 14:
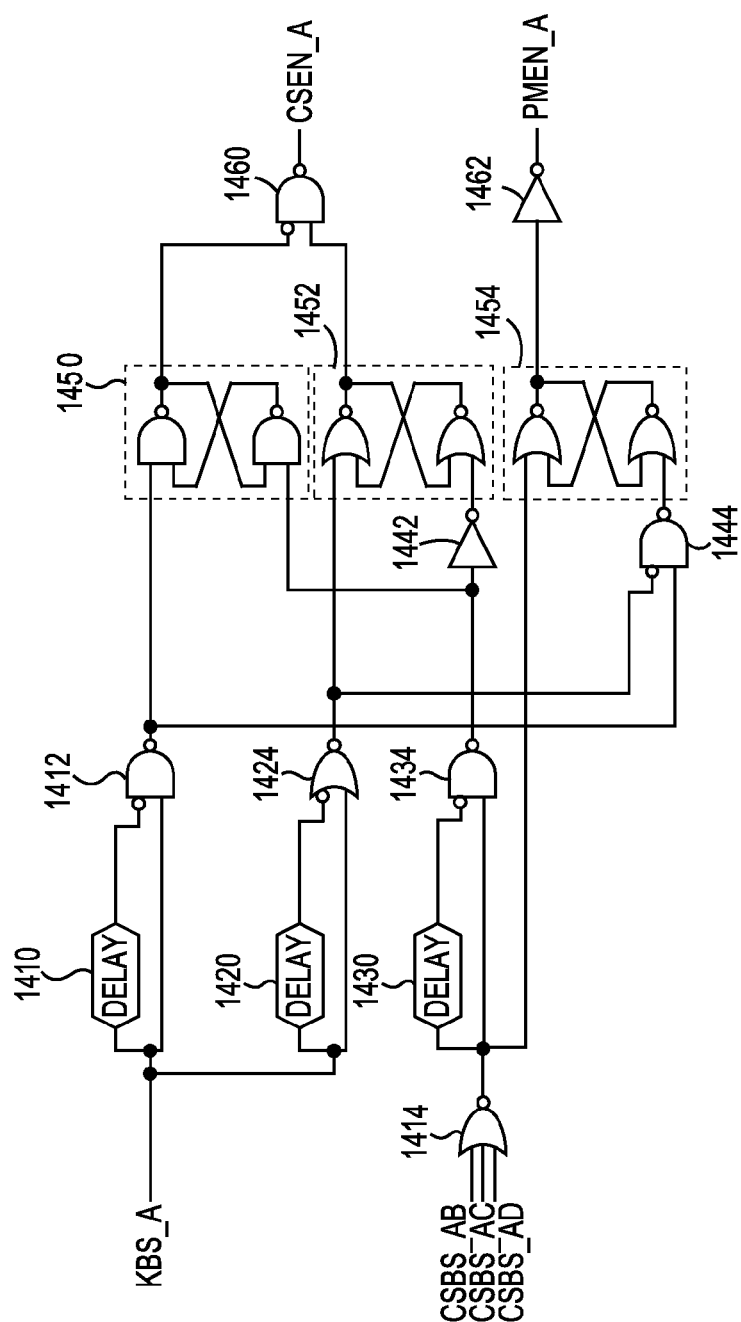
FIG. 14 is an exemplary charge timing control circuit according to an embodiment of the disclosure.

FIG. 14 provides an exemplary charge timing control circuit 1400 that may be used to implement the charge timing control circuit 1310(A) of FIG. 13. One of skill in the art would also appreciate that the charge timing control circuit 1400 could be modified to be implemented in the charge timing control circuits 1310(B-D) of FIG. 13 by receiving and providing the respective "B", "C" or "D" signals (e.g., KBS_B/C/D, CSEN_B/C/D, and PMEN_B/C/D signals). The charge timing control circuit 1400 may include a SRB latch 1450, a SR latch 1452, a SR latch 1454, and a NAND gate 1460 that are configured provide the CSEN_A signal and the PMEN_A signal responsive to transitions of the KBS_A and CSBS_AB/AC/AD signals.

The SRB latch 1450 may be configured to detect (e.g., indicated by setting an output to a low logic value) a transition of the KBS_A signal from a low logic level to a high logic level (e.g., via the delay 1410 and the NAND gate 1412) and to be reset the output to a high logic level value responsive to a transition of one of the CSBS_AB/AC/AD signals from a low logic level to a high logic level (e.g., via the NOR gate 1414, delay 1430, and NAND gate 1434). That is, the NAND gate 1412 may provide a low pulse (e.g., length set by the delay 1410) to the SRB latch 1450 when the KBS_A signal transitions from low to high, and the output of the SRB latch 1450 may transition to a high logic level. Responsive to the high logic level from the SRB latch 1450 (inverted to a low logic level at the input of the NAND gate 1460), the NAND gate 1460 may set the CSEN_A signal to a high logic level. The NAND gate 1434 may provide a low pulse (e.g., length set by the delay 1430) to the SRB latch 1450 when the one of the CSBS_AB/AC/AD signals transitions (e.g., detected by the NOR gate 1414) from low to high, and the output of the SRB latch 1450 may transition to a low logic level. Responsive to the low logic level from the SRB latch 1450 (inverted to a low logic level at the input of the NAND gate 1460), the NAND gate 1460 may set the CSEN_A signal to a low logic level.

The SR latch 1452 may be configured to detect (e.g., indicated by setting an output to a high logic value) a transition of the KBS_A signal from a high logic level to a low logic level (e.g., via the delay 1420, the NOR gate 1424, and a inverter 1442) and to be reset the output to a low logic level value responsive to a transition of one of the CSBS_AB/AC/AD signals from NAND gate 1434 from a low logic level to a high logic level (e.g., via the NOR gate 1414, delay 1430, and NAND gate 1434). That is, the NOR gate 1424 via the inverter 1442 may provide a low pulse (e.g., length set by the delay 1420) to the SR latch 1452 when the KBS_A signal transitions from high to low, and the output of the SR latch 1452 may transition to a low logic level. Responsive to the low logic level from the SR latch 1452, the NAND gate 1460 may set the CSEN_A signal to a high logic level. Thus, the SRB latch 1450, SR latch 1452, and NAND gate 1460 may be configured to set the CSEN_A signal to a high logic level responsive to detecting a transition of the KBS_A signal from one logic level to an opposite logic level and to be reset responsive to transition of one of the CSBS_AB/AC/AD signals.

The SR latch 1454 may be configured to detect (e.g., indicated by setting an output to a low logic value) a transition of one of the CSBS_AB/AC/AD signals (via the NOR gate 1414) from a low logic level to a high logic level and to be reset to a low logic level responsive to any transition of the KBS_A signal (e.g., via the delay 1410, NAND gate 1412, delay 1420, NOR gate 1424, and the NAND gate 1444). For example, based on the inverted logic levels at the inputs, the NOR gate 1424 may provide a low logic level and the NAND gate 1412 may provide a high logic level and the NAND gate 1444 may provide a low logic level based on the inverted output of the NOR gate 1424 (e.g., high logic level) and the output (e.g., high logic level) of the NAND gate 1412. Responsive to a transition of the KBS_A signal from a low logic level to a high logic level, the NAND gate 1412 may provide a low logic level pulse (e.g., length set by the delay 1430) to the NAND gate 1444, and the NAND gate 1444 may provide a high logic level pulse to the SR latch 1454 to reset the output to a low logic level. The inverter 1462 may invert the output to provide the PMEN_A signal having a high logic level. Responsive to a transition of the KBS_A signal from a high logic level to a low logic level, the NOR gate 1424 may provide a high logic level pulse (e.g., length set by the delay 1420) to the NAND gate 1444, and the NAND gate 1444 may provide a high logic level pulse to the SR latch 1454 to reset the output to a high logic level. The inverter 1462 may invert the output to provide the PMEN_A signal having a low logic level.

Figure 15A:
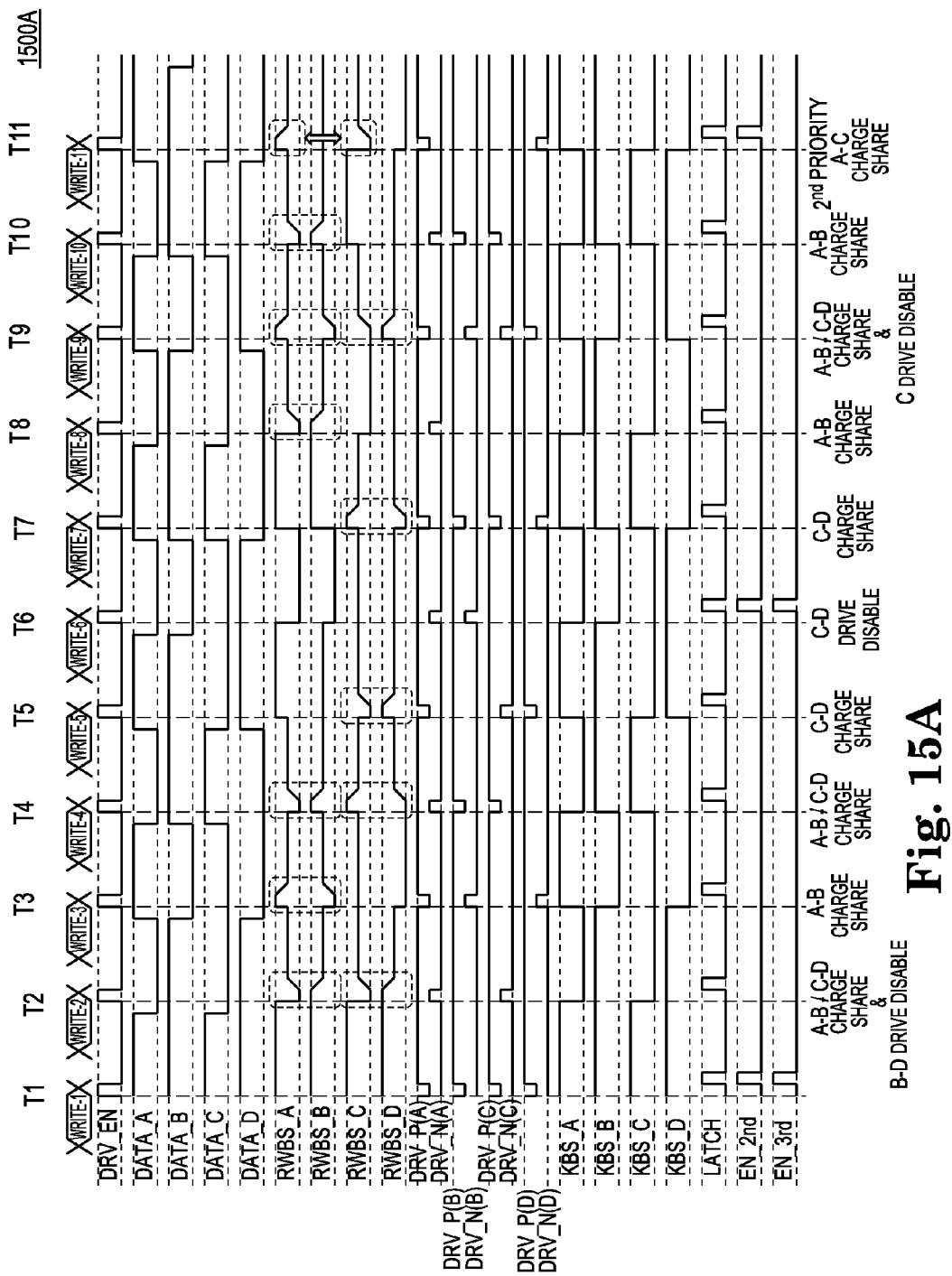
FIGS. 15A and 15B are exemplary timing diagrams depicting various scenarios for charge sharing and drive disabling according to an embodiment of the disclosure.
Figure 15B:
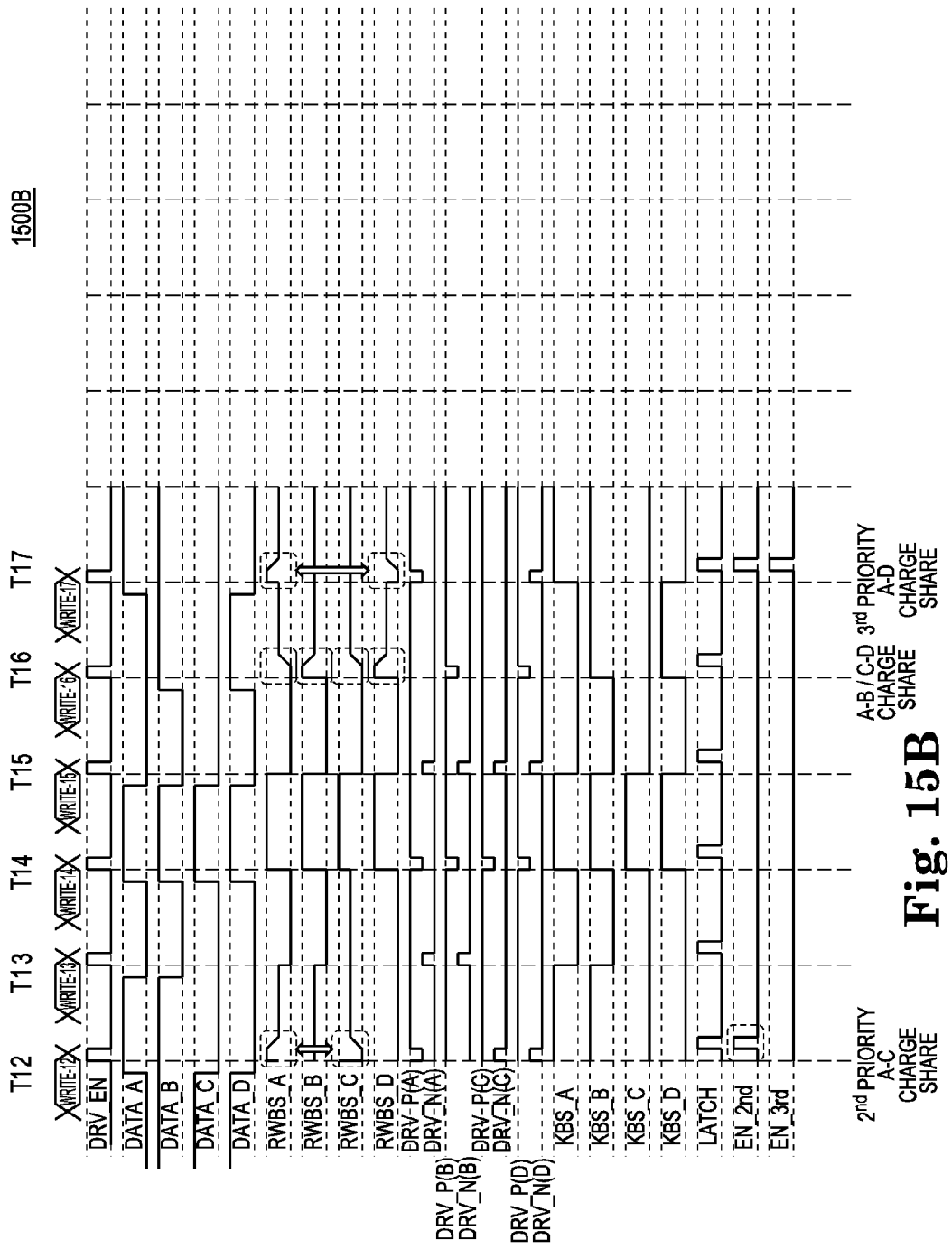

FIGS. 15A and 15B provide an exemplary timing diagram depicting various scenarios for charge sharing and drive disabling according to an embodiment of the disclosure. The signals depicted in FIG. 15 may correspond to the signals of the same names in FIGS. 12 and 3. At time T1, all of RWBS_A-D are at high logic levels, thus no charge sharing occurs.

At time T2, DATA_A and C transition to low logic levels and thus the RWBS_A and C lines are driven to the low logic level responsive to the DRV_N(A) and (C) signals. The driving of the RWBS_B and D lines to the high logic level of DATA_B and D is disabled because they were previously driven to the high logic level. The RWBS_A and B lines and the RWBS_C and D lines now each have inverted logic levels, and thus a charge share is initiated (e.g., via the charge share control circuit 1232 of FIG. 12) to transition the RWBS_A and B lines and the RWBS_C and D lines to a mid-range level (e.g., via the charge share circuit 130(AB) and charge share circuit 130(CD) of FIG. 12).

At time T3, DATA_A transitions to a high logic level and thus the RWBS_A line is driven to the high logic level responsive to the DRV_P(A) signal. Further, DATA_B transitions to a low logic level and thus the RWBS_B line is driven to the low logic level responsive to the DRV_N(B) signal. The driving of the RWBS_C and D lines to the low and high logic levels, respectively, of DATA_C and D is disabled because they were previously driven to the respective low and high logic levels. The RWBS_A and B lines now have inverted logic levels, and thus a charge share is initiated (e.g., via the charge share control circuit 1232 of FIG. 12) to transition the RWBS_A and B lines to a mid-range level (e.g., via the charge share circuit 130(AB)).

At time T4, DATA_A and D transition to low logic levels and thus the RWBS_A and D lines are driven to the low logic level responsive to the DRV_N(A) and (D) signals. DATA_B and C transition to high logic levels and thus the RWBS_B and C lines are driven to the high logic levels responsive to the DRV_P(B) and (C) signals. The RWBS_A and B lines and the RWBS_C and D lines now each have inverted logic levels, and thus a charge share is initiated (e.g., via the charge share control circuit 1232 of FIG. 12) to transition the RWBS_A and B lines and the RWBS_C and D lines to a mid-range level (e.g., via the charge share circuit 130(AB) and charge share circuit 130(CD) of FIG. 12).

At time T5, DATA_C transitions to a low logic level and thus the RWBS_C line is driven to the low logic level responsive to the DRV_N(C) signal. Further, DATA_D transitions to a high logic level and thus the RWBS_D line is driven to the high logic level responsive to the DRV_P(D) signal. The RWBS_C and D lines now have inverted logic levels, and thus a charge share is initiated (e.g., via the charge share control circuit 1232 of FIG. 12) to transition the RWBS_C and D lines to a mid-range level (e.g., via the charge share circuit 130(CD)).

At time T6, DATA_A and B transition to a low logic level and thus the RWBS_A and B lines are driven to the low logic level responsive to the DRV_N(A) and (B) signals. The driving of the RWBS_C and D lines to the low and high logic levels, respectively, of DATA_C and D is disabled because they were previously driven to the respective low and high logic levels.

At time T7, Further, DATA_C transitions to a high logic level and thus the RWBS_C line is driven to the high logic level responsive to the DRV_P(C) signal. Further, DATA_D transitions to a low logic level and thus the RWBS_D line is driven to the low logic level responsive to the DRV_N(D) signal. The RWBS_C and D lines now have inverted logic levels, and thus a charge share is initiated (e.g., via the charge share control circuit 1232 of FIG. 12) to transition the RWBS_C and D lines to a mid-range level (e.g., via the charge share circuit 130(CD)).

At time T8, DATA_A transitions to a low logic level and thus the RWBS_A line is driven to the low logic level responsive to the DRV_N(A) signal. Further, DATA_B transitions to a high logic level and thus the RWBS_B line is driven to the high logic level responsive to the DRV_P(B) signal. The RWBS_A and B lines now have inverted logic levels, and thus a charge share is initiated (e.g., via the charge share control circuit 1232 of FIG. 12) to transition the RWBS_A and B lines to a mid-range level (e.g., via the charge share circuit 130(AB)).

At time T9, DATA_A and D transition to high logic levels and thus the RWBS_A and D lines are driven to the high logic level responsive to the DRV_P(A) and (D) signals. The driving of the RWBS_C line to the low logic levels of DATA_C is disabled because it was previously driven to the low logic level. The RWBS_A and B lines and the RWBS_C and D lines now each have inverted logic levels, and thus a charge share is initiated (e.g., via the charge share control circuit 1232 of FIG. 12) to transition the RWBS_A and B lines and the RWBS_C and D lines to a mid-range level (e.g., via the charge share circuit 130(AB) and charge share circuit 130(CD) of FIG. 12).

At time T10, DATA_A transitions to a low logic level and thus the RWBS_A line is driven to the low logic level responsive to the DRV_N(A) signal. Further, DATA_B transitions to a high logic level and thus the RWBS_B line is driven to the high logic level responsive to the DRV_P(B) signal. The RWBS_A and B lines now have inverted logic levels, and thus a charge share is initiated (e.g., via the charge share control circuit 1232 of FIG. 12) to transition the RWBS_A and B lines to a mid-range level (e.g., via the charge share circuit 130(AB)).

At time T11, DATA_A transitions to a high logic level and thus the RWBS_A line is driven to the high logic level responsive to the DRV_P(A) signal. Further, DATA_C transitions to a low logic level and thus the RWBS_C line is driven to the low logic level responsive to the DRV_N(C) signal. The RWBS_A and C lines now have inverted logic levels, and thus a charge share is initiated (e.g., via the charge share control circuit 1232 of FIG. 12) to transition the RWBS_A and C lines to a mid-range level (e.g., via the charge share circuit 130(AC)).

At time T12, DATA_A transitions to a high logic level and thus the RWBS_A line is driven to the high logic level responsive to the DRV_P(A) signal. Further, DATA_C transitions to a low logic level and thus the RWBS_C line is driven to the low logic level responsive to the DRV_P(C) signal. The RWBS_A and C lines now have inverted logic levels, and thus a charge share is initiated (e.g., via the charge share control circuit 1232 of FIG. 12) to transition the RWBS_A and C lines to a mid-range level (e.g., via the charge share circuit 130(AC)).

At time T16, DATA_B and D transition to high logic levels and thus the RWBS_B and D lines are driven to the high logic level responsive to the DRV_P(B) and (D) signals. The RWBS_A and B lines and the RWBS_C and D lines now each have inverted logic levels, and thus a charge share is initiated (e.g., via the charge share control circuit 1232 of FIG. 12) to transition the RWBS_A and B lines and the RWBS_C and D lines to a mid-range level (e.g., via the charge share circuit 130(AB) and charge share circuit 130(CD) of FIG. 12).

At time T17, DATA_A transitions to a high logic level and thus the RWBS_A line is driven to the high logic level responsive to the DRV_P(A) signal. Further, DATA_D transitions to a low logic level and thus the RWBS_C line is driven to the low logic level responsive to the DRV_N(D) signal. The RWBS_A and D lines now have inverted logic levels, and thus a charge share is initiated (e.g., via the charge share control circuit 1232 of FIG. 12) to transition the RWBS_A and D lines to a mid-range level (e.g., via the charge share circuit 130(AD)).

The timing diagram 1500 and 1501 of FIGS. 15A/B are exemplary to show interplay between signals within the apparatus 1200. One of skill in the art would recognize that the data sequence may vary from depicted, and the relative timing of the signals may vary.

Figure 16:
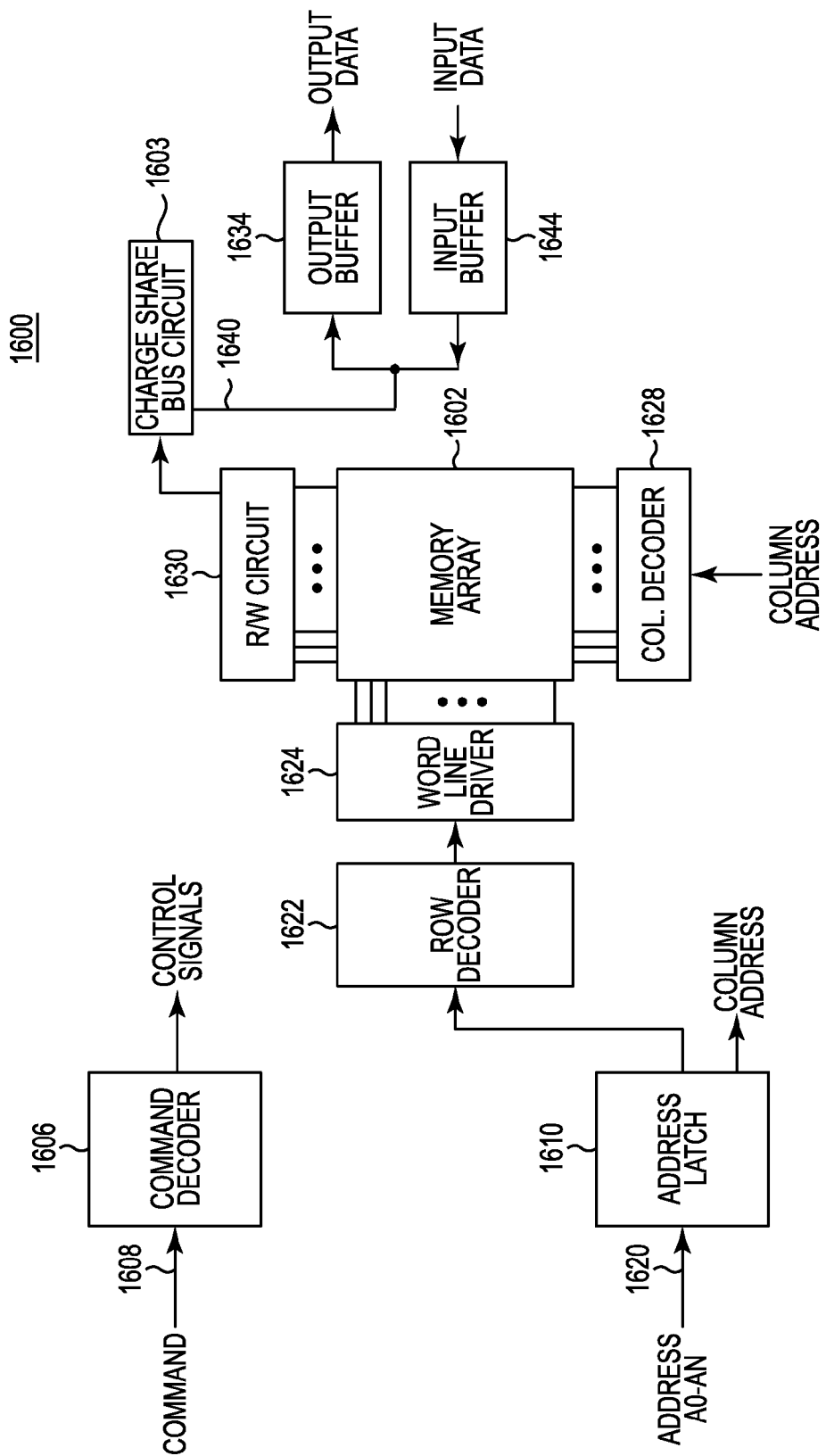
FIG. 16 is a block diagram of a memory according to an embodiment of the disclosure.

FIG. 16 is a block diagram of a memory 1600 according to an embodiment of the disclosure. The memory 1600 includes an array 1602 of memory cells, which may be, for example, DRAM memory cells, SRAM memory cells, flash memory cells, or some other types of memory cells and may include any number of banks and/or sections of memory as described herein. The memory 1600 includes a command decoder 1606 configured to receive memory commands 1608 through a CMD bus. The command decoder 1606 may generate control signals based on the memory commands 1608 received through the CMD bus. The memory 1600 may also include an address latch 1610 configured to receive address A0-AN signals 1620 from an address bus. The address latch 1610 may provide row and column addresses The address latch then outputs separate column addresses and separate row addresses.

The row and column addresses are provided by the address latch 1610 to a row address decoder 1622 and a column address decoder 1628, respectively. The column address decoder 1628 selects lines extending through the array 1602 corresponding to respective column addresses. The row address decoder 1622 is connected to word line driver 1624 that activates respective rows of memory cells in the array 1602 corresponding to received row addresses. The selected line (e.g., a bit line or bit lines) corresponding to a received column address are coupled to a read/write circuitry 1630 to provide read data to a data output circuit 1634 via an input-output data bus 1640. The charge share bus circuit 1603 may drive the data to the 1634 from the R/W circuit 1630. The charge share bus circuit may include the apparatus 100 of FIG. 1, the keeper 200 of FIG. 2, the RWBS driver 300 of FIG. 3, the charge share circuit 400 of FIG. 4, the buss keeper 500 of FIG. 5, the charge share control circuit 700 of FIG. 7, the charge timing circuit 800 of FIG. 8, the first signal transition detect circuit 900 of FIG. 9, the second signal transition detect circuit 1000 of FIG. 10, the apparatus 1200 of FIG. 12, the charge share control circuit 1300 of FIG. 13, the charge timing control circuit 1400 of FIG. 14, or any combination thereof. Write data are provided to the memory array 1602 through a data input circuit 1644 and the memory array read/write circuitry 1630.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus, comprising:
a first bus;
a second bus;
a charge sharing circuit coupled to each of the first bus and the second bus, the charge sharing circuit configured to couple the first bus to the second bus based on logic levels of the first bus and the second bus, wherein the charge sharing circuit is configured to couple the first bus to the second bus when the first bus and the second bus are driven to different logic levels from each other;
a first keeper circuit configured to latch a logic level of the first bus and to maintain the latched logic level when a logic level of the first bus is at a mid-range level between a high logic level and a low logic level;
a second keeper circuit configured to latch a logic level of the second bus and to maintain the latched logic level when a logic level of the second bus is at a mid-range level between the high logic level and the low logic level;
a first latch circuit configured to latch the logic level of the first bus as the latched logic level of the first keeper circuit to provide an output of the first bus; and
a second latch circuit configured to latch the logic level of the second bus as the latched logic level of the second keeper circuit to provide an output of the second bus.

2. The apparatus of claim 1, wherein the charge sharing circuit is configured to decouple the first bus from the second bus when the first bus and the second bus are driven to equal logic levels.

3. The apparatus of claim 1, further comprising a charge share control circuit configured to detect the logic levels of the first bus and the second bus and to provide a control signal to the charge sharing circuit having a value based on the detected logic levels of the first bus and the second bus.

4. The apparatus of claim 1, further comprising:
a first driver circuit configured to drive the first bus to a first logic level based on received first data and a first previously driven logic level; and
a second driver circuit configured to drive the second bus to a second logic level based on received second data and a second previously driven logic level.

5. The apparatus of claim 4, further comprising:
a first keeper circuit configured to latch a logic level of the first bus as the first previously driven logic level and to maintain the latched first previously driven logic level when a logic level of the first bus is at a mid-range level between a high logic level and a low logic level; and
a second keeper circuit configured to latch a logic level of the second bus as the second previously driven logic level and to maintain the latched second previously driven logic level when a logic level of the second bus is at a mid-range level between the high logic level and the low logic level.

6. An apparatus comprising:
a first bus;
a second bus;
a charge sharing circuit coupled to each of the first bus and the second bus, the charge sharing circuit configured to couple the first bus to the second bus based on logic levels of the first bus and the second bus;
a plurality of additional buses;
a first plurality of charge share circuits, wherein each of the first plurality of charge share circuits is coupled between the first bus and a respective one of the plurality of additional buses, and wherein, based on a priority selection, one of the first plurality of charge share circuits is configured to couple the first bus to the respective one of the first plurality of additional buses responsive to the first bus and the respective one of the plurality of additional buses having inverted logic levels; and a second plurality of charge share circuits, wherein each of the second plurality of charge share circuits is coupled between the second bus and a respective one of the plurality of additional buses, and wherein, based on a priority selection, one of the second plurality of charge share circuits is configured to couple the second bus to the respective one of the plurality of additional buses responsive to the second bus and the respective one of the plurality of additional buses having inverted logic levels.

7. An apparatus, comprising:
a charge share control circuit configured to set a control signal having a value based on relative logic levels of a first bus and a second bus;
a charge share circuit configured to couple the first bus to the second bus responsive to the control signal having a value indicating the first bus has an inverted logic level relative to a logic level of the second bus;
a first charge timing control circuit configured to provide a first charge share enable signal responsive to a transition of a logic level of the first bus;
a second charge timing control circuit configured to provide a second charge share enable signal responsive to a transition of a logic level of the second bus; and
a gate circuit configured to provide the control signal based on the first charge share enable signal, the second charge share enable signal, and relative logic levels of the first bus and the second bus.

8. The apparatus of claim 7, wherein the first charge timing control circuit comprises a signal transition detection circuit configured to assert the first charge share enable signal responsive a transition of a logic level of the first bus and configured to reset the first charge share enable signal responsive to a transition of a logic level of the control signal.

9. The apparatus of claim 8, wherein the signal transition detection circuit comprises:
a first latch circuit configured to set a first latch signal responsive to transition of the logic level of the first bus from a low logic level to a high logic level and to reset the first latch signal responsive to the control signal;
a second latch circuit configured to set a second latch signal responsive to transition of the logic level of the first bus from a high logic level to a low logic level and to reset the second latch signal responsive to the control signal; and
a gate circuit configured to provide the charge sense enable signal based on the first latch signal and the second latch signal.

10. An apparatus, comprising:
a charge share control circuit configured to set a control signal having a value based on relative logic levels of a first bus and a second bus;
a charge share circuit configured to couple the first bus to the second bus responsive to the control signal having a value indicating the first bus has an inverted logic level relative to a logic level of the second bus;
a first keeper circuit configured to latch a logic level of the first bus as a first latch signal and to provide the first latch signal to the charge share control circuit; and a second keeper circuit configured to latch a logic level of the second bus as a second latch signal and to provide the second latch signal to the charge share control circuit.

11. The apparatus of claim 10, wherein the first keeper circuit comprises:
a first latch circuit configured to provide a first intermediate latch signal having a logic level based on a logic level of the first bus;
a second latch circuit configured to provide a second intermediate latch signal having a logic level based on a logic level of the first bus, wherein the logic level of the first intermediate latch signal is equal to a logic level of the second intermediate latch signal;
a driver circuit configured to provide the first latch signal having a logic level based on the logic level of the first intermediate latch signal and the logic level of the second intermediate latch signal;
a pass gate configured to provide the logic level of the first bus to the first and second latch circuits when the logic level of the first bus has either a logic level or a low logic level;
a first inverter configured to provide a first pass gate signal to a first gate of the pass gate having a mid-range level when the first intermediate signal has a low logic level and a low logic level when the first intermediate signal has the high logic level; and
a second inverter configured to provide a second pass gate signal to a first gate of the pass gate having the high logic level when the first intermediate signal has the low logic level and the mid-range level when the first intermediate signal has the high logic level.

12. A method, comprising:
receiving a first logic level on a first bus;
receiving a second logic level on a second bus;
latching the first logic level on the first bus;
latching the second logic level on the second bus;
providing a control signal indicative of the first logic level on the first bus being an inverted logic level relative to the second logic level on the second bus; and
coupling the first bus to the second bus based on the control signal.

13. The method of claim 12, further comprising, responsive to the first logic level on the first bus being equal to the second logic level on the second bus, decoupling the first bus from the second bus.

14. The method of claim 12, wherein coupling the first bus to the second bus is additionally responsive to a transition of the first bus to the first logic level.

15. The method of claim 12, further comprising:
maintaining the latched first logic level of the first bus while the first bus has a logic level between a high logic level and a low logic level.

16. The method of claim 12, further comprising:
disabling a first driver when next first data has the first logic level; and
disabling a second driver when next second data has the second logic level.

* * * * *